US009485683B2

(12) United States Patent
Chincholi et al.

(10) Patent No.: US 9,485,683 B2
(45) Date of Patent: Nov. 1, 2016

(54) SENSING MEASUREMENT CONFIGURATION AND REPORTING IN A LONG TERM EVOLUTION SYSTEM OPERATING OVER LICENSE EXEMPT BANDS

(71) Applicant: INTERDIGITAL PATENT HOLDINGS, INC., Wilmington, DE (US)

(72) Inventors: Amith V. Chincholi, West Babylon, NY (US); Joseph M. Murray, Schwenksville, PA (US); Alpaslan Demir, East Meadow, NY (US); Martino M. Freda, Laval (CA); Athmane Touag, Laval (CA); Jean-Louis Gauvreau, La Prairie (CA); David S. Bass, Great Neck, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 600 days.

(21) Appl. No.: 13/907,216

(22) Filed: May 31, 2013

(65) Prior Publication Data
US 2013/0322279 A1 Dec. 5, 2013

Related U.S. Application Data

(60) Provisional application No. 61/653,746, filed on May 31, 2012.

(51) Int. Cl.
*H04L 12/28* (2006.01)
*H04W 24/10* (2009.01)
(Continued)

(52) U.S. Cl.
CPC ......... *H04W 24/10* (2013.01); *H04W 36/0088* (2013.01)

(58) Field of Classification Search
USPC .......................... 370/252, 278, 329, 430, 442
See application file for complete search history.

(56) References Cited

U.S. PATENT DOCUMENTS

2011/0292854 A1* 12/2011 Terry ..................... H04L 5/001
370/311
2013/0017841 A1* 1/2013 Kazmi .................. G01S 5/0236
455/456.1
2013/0201884 A1* 8/2013 Freda .................. H04W 72/005
370/278

OTHER PUBLICATIONS

IEEE Standard for Information Technology—Telecommunications and Information Exchange Between Systems Local and Metropolitan Area Networks—Specific Requirements; Part 11: Wireless LAN Medium Access Control (MAC) and Physical Layer (PHY) Specifications, IEEE Std 802.11-2012 (Mar. 29, 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)," 3GPP TS 36.300 V8.12.0 (Mar. 2010).

(Continued)

*Primary Examiner* — John Pezzlo
(74) *Attorney, Agent, or Firm* — Condo Roccia Koptiw LLP

(57) ABSTRACT

A method for sensing measurement gap scheduling includes allocating a new supplementary carrier in a license-exempt spectrum by a radio resource management (RRM) entity in an evolved Node B (eNB); configuring a local cognitive sensing entity in the eNB by the RRM entity; configuring a wireless transmit/receive unit (WTRU) for cognitive sensing through radio resource control (RRC) signaling, the RRC signaling being generated by the eNB; configuring a local cognitive sensing entity at the WTRU by a dynamic spectrum management (DSM) entity; and signaling a start and a duration of a measurement gap to an enhanced sensing component.

20 Claims, 24 Drawing Sheets

(51) Int. Cl.
*H04W 36/00* (2009.01)
*H04J 1/16* (2006.01)

(56) References Cited

OTHER PUBLICATIONS

Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.9.0 (Dec. 2011).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 9)," 3GPP TS 36.300 V9.10.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.7.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 10)," 3GPP TS 36.300 V10.9.0 (Dec. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.1.0 (Mar. 2012).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 11)," 3GPP TS 36.300 V11.5.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.16.0 (Dec. 2011).
Third Generation Partnership Project, "Technical Specification Group Radio Access Network; Evolved Universal Terrestrial Radio Access (E-UTRA); Radio Resource Control (RRC); Protocol specification (Release 8)," 3GPP TS 36.331 V8.19.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.10.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 9)," 3GPP TS 36.331 V9.14.1 (Mar. 2013).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.5.0 (Mar. 2012).
Third Generation Partnership Project, "Technical Specification Group Radio Access Network; Evolved Universal Terrestrial Radio Access (E-UTRA); Radio Resource Control (RRC); Protocol specification (Release 10)," 3GPP TS 36.331 V10.9.0 (Mar. 2013).
Third Generation Partnership Project, "Technical Specification Group Radio Access Network; Evolved Universal Terrestrial Radio Access (E-UTRA); Radio Resource Control (RRC); Protocol specification (Release 11)," 3GPP TS 36.331 V11.3.0 (Mar. 2013).
Third Generation Partnership Project, "Technical Specification Group Radio Access Network; Evolved Universal Terrestrial Radio Access Network (E-UTRAN); X2 application protocol (X2AP) (Release 8)," 3GPP TS 36.423 V8.9.0 (Mar. 2010).
Third Generation Partnership Project, "Technical Specification Group Radio Access Network; Evolved Universal Terrestrial Radio Access Network (E-UTRAN); X2 application protocol (X2AP) (Release 9)," 3GPP TS 36.423 V9.6.0 (Mar. 2011).
Third Generation Partnership Project, "Technical Specification Group Radio Access Network; Evolved Universal Terrestrial Radio Access Network (E-UTRAN); X2 application protocol (X2AP) (Release 10)," 3GPP TS 36.423 V10.5.0 (Mar. 2012).
Third Generation Partnership Project, "Technical Specification Group Radio Access Network; Evolved Universal Terrestrial Radio Access Network (E-UTRAN); X2 application protocol (X2AP) (Release 11)," 3GPP TS 36.423 V11.0.0 (Mar. 2012).
Third Generation Partnership Project, "Technical Specification Group Radio Access Network; Evolved Universal Terrestrial Radio Access Network (E-UTRAN); X2 application protocol (X2AP) (Release 11)," 3GPP TS 36.423 V11.4.0 (Mar. 2013).
Third Generation Partnership Project, "Technical Specification Group Radio Access Network; Evolved Universal Terrestrial Radio Access Network (E-UTRAN); S1 Application Protocol (S1AP) (Release 8)," 3GPP TS 36.413 V8.10.0 (Jun. 2010).
Third Generation Partnership Project, "Technical Specification Group Radio Access Network; Evolved Universal Terrestrial Radio Access Network (E-UTRAN); S1 Application Protocol (S1AP) (Release 9)," 3GPP TS 36.413 V9.8.0 (Dec. 2011).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.5.0 (Mar. 2012).
Third Generation Partnership Project, "Technical Specification Group Radio Access Network; Evolved Universal Terrestrial Radio Access Network (E-UTRAN); S1 Application Protocol (S1AP) (Release 10)," 3GPP TS 36.413 V10.6.0 (Jun. 2012).
Third Generation Partnership Project, "Technical Specification Group Radio Access Network; Evolved Universal Terrestrial Radio Access Network (E-UTRAN); S1 Application Protocol (S1AP) (Release 11)," 3GPP TS 36.413 V11.3.0 (Mar. 2013).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.17.0 (Mar. 2012).
Third Generation Partnership Project, "Technical Specification Group Radio Access Network; Evolved Universal Terrestrial Radio Access (E-UTRA); Requirements for support of radio resource management (Release 8)," 3GPP TS 36.133 V8.21.0 (Mar. 2013).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.11.0 (Mar. 2012).
Third Generation Partnership Project, "Technical Specification Group Radio Access Network; Evolved Universal Terrestrial Radio Access (E-UTRA); Requirements for support of radio resource management (Release 9)," 3GPP TS 36.133 V9.15.0 (Mar. 2013).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.6.0 (Mar. 2012).
Third Generation Partnership Project, "Technical Specification Group Radio Access Network; Evolved Universal Terrestrial Radio Access (E-UTRA); Requirements for support of radio resource management (Release 10)," 3GPP TS 36.133 V10.10.0 (Mar. 2013).
Third Generation Partnership Project, "Technical Specification Group Radio Access Network; Evolved Universal Terrestrial Radio Access (E-UTRA); Requirements for support of radio resource management (Release 11)," 3GPP TS 36.133 V11.0.0 (Mar. 2012).
Third Generation Partnership Project, "Technical Specification Group Radio Access Network; Evolved Universial Terrestrial Radio Access (E-UTRA); Requirements for support of radio resource management (Release 11)," 3GPP TS 36.133 V11.4.0 (Mar. 2013).

* cited by examiner

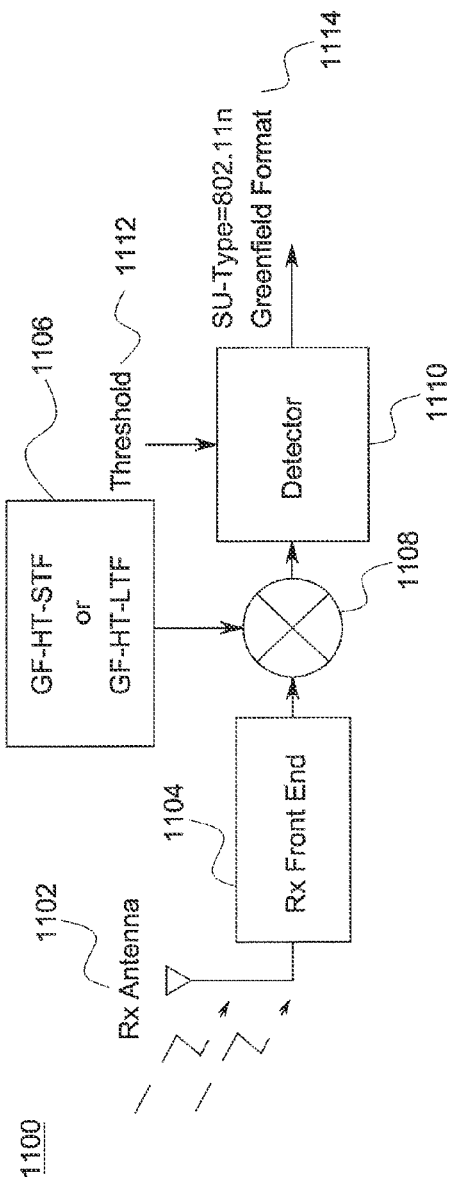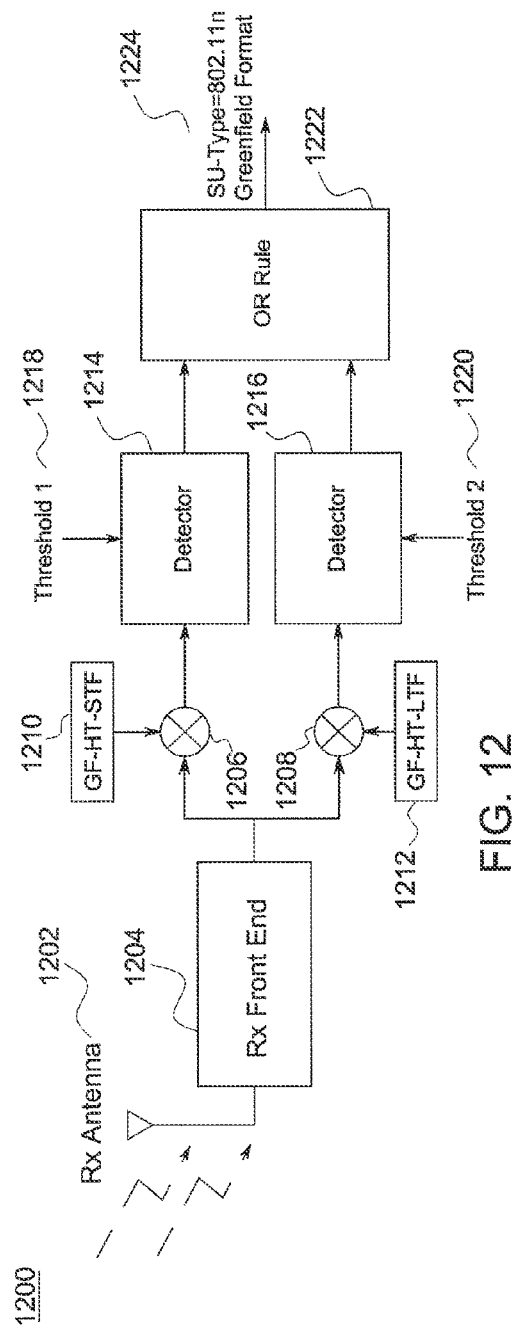

SENSING MEASUREMENT CONFIGURATION AND REPORTING IN A LONG TERM EVOLUTION SYSTEM OPERATING OVER LICENSE EXEMPT BANDS

CROSS REFERENCE TO RELATED APPLICATIONS

This application claims the benefit of U.S. Provisional Application No. 61/653,746, filed May 31, 2012, the contents of which are hereby incorporated by reference herein.

BACKGROUND

The 3GPP Long Term Evolution (LTE) Release 10 (R10) standard supports the concept of component carrier aggregation. The standard works on the assumption that all component carriers may operate on licensed spectrum with exclusive rights for operation by the cellular network operators who own the spectrum. The standard supports operation of up to five component carriers simultaneously where one component carrier may be assigned to be the primary/anchor component carrier, while the remaining component carriers may be considered secondary component carriers.

SUMMARY

Some component carriers may operate on licensed spectrum with exclusive rights for operation by the cellular network operators who own the spectrum while other component carriers may operate on unlicensed or lightly-licensed spectrum like 2.4 GigaHertz (GHz) industrial, scientific and medical (ISM) band and television white space (TVWS) spectrum. Methods and apparatuses may support spectrum sensing and enable the opportunistic use of license-exempt (LE) bands as supplementary component carriers (SuppCCs). Wireless transmit/receive unit (WTRU) and evolved Node B (eNB) architectures may enable spectrum sensing. Methods may include configuring and reporting cognitive sensing measurements, including measurement quantities and reporting events. Examples of such methods may include a radio resource control (RRC) Measurement Configuration and Reporting procedure, and the use of an Information Transfer message. Methods may detect and characterize secondary user (SU) activity, and may include a signal classification-based feature detection in the context of cellular technology. A WTRU procedure may report cognitive sensing capabilities.

Methods may perform reliable primary user (PU) detection in the presence of other SU devices and networks. To synchronize measurement gaps, an autonomous and/or blind detection approach may be used, which may use neighbor supplementary cell (SuppCell) measurements, for example reference signal received quality (RSRQ), to determine and synchronize with a neighbor cell's gap pattern. According to a centralized approach, a neighbor cell's gap pattern may be signaled to the eNB directly, and may use enhanced X2AP messages over the X2 interface, or via the Mobility Management Entity/Serving Gateway (MME/S-GW) using S1AP messages over the S1 interface. For unsynchronized measurement gaps, natural gaps may be used, which may be periods where the gaps of a given network overlap with periods of inactivity in the other networks. Methods may configure and report sensing results for SuppCells originating from a target eNB to facilitate a seamless handover procedure. Such methods may allow SuppCells to be configured and activated during the handover procedure.

BRIEF DESCRIPTION OF THE DRAWINGS

A more detailed understanding may be had from the following description, given by way of example in conjunction with the accompanying drawings, wherein:

FIG. 11 shows an example of a receiver for Wi-Fi preamble based feature detection, for sensing a Greenfield (GF) HT 802.11n Wi-Fi signal operating as a SU;

FIG. 12 shows an example of a receiver for Wi-Fi preamble based feature detection, for sensing a Greenfield (GF) HT 802.11n Wi-Fi signal operating as a SU;

DETAILED DESCRIPTION

Figure 1A:
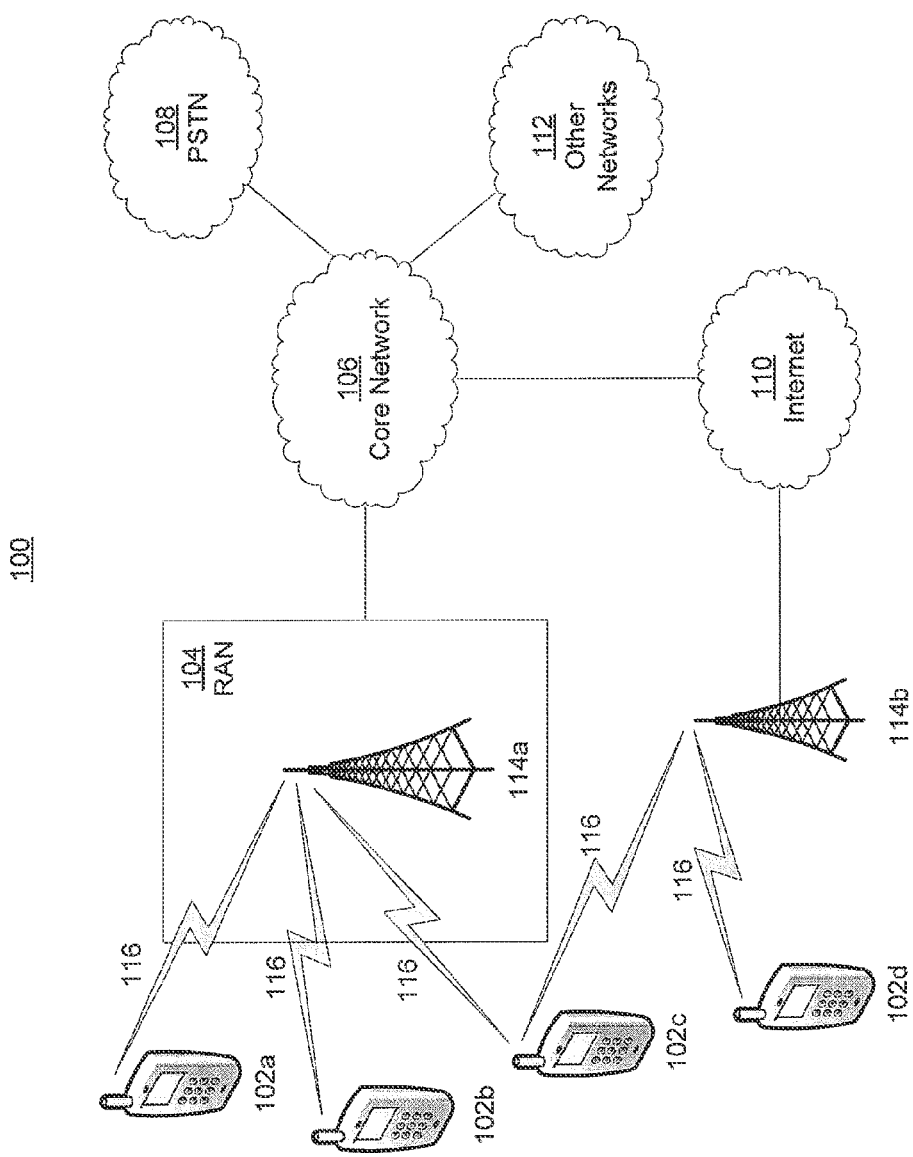
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the other networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
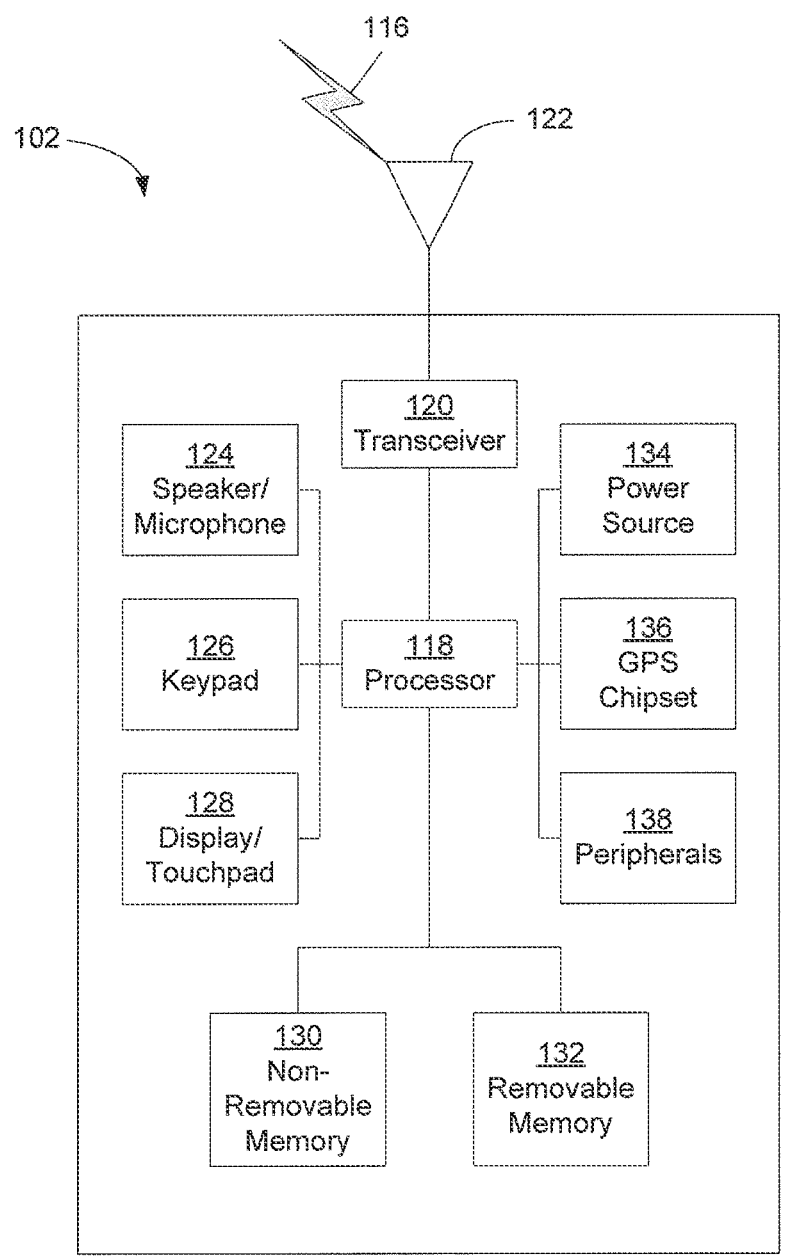
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
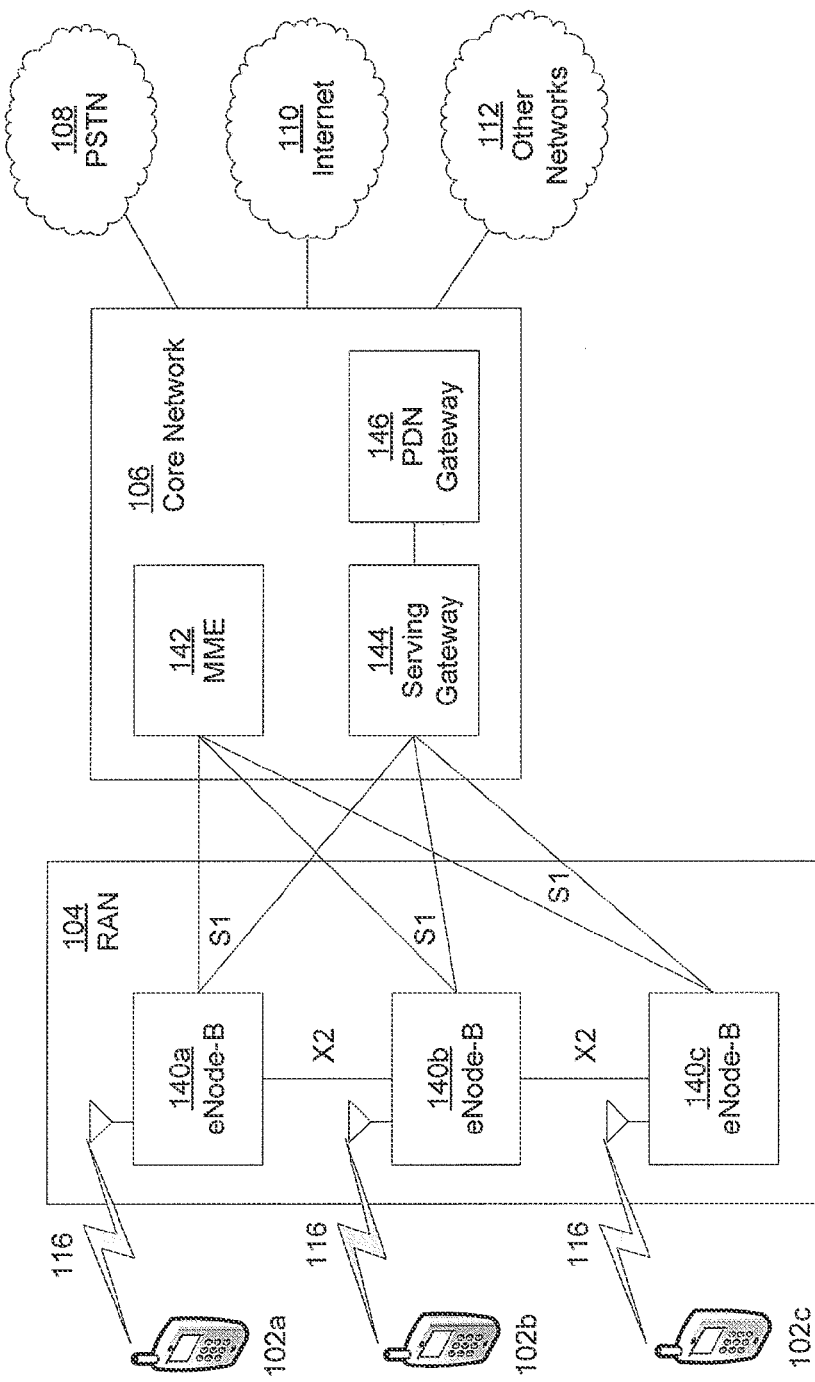
FIG. 1C is a system diagram of an example radio access network and an example core network that may be used within the communications system illustrated in FIG. 1A.

FIG. 1C is a system diagram of the RAN 104 and the core network 106 according to an embodiment. As noted above, the RAN 104 may employ an E-UTRA radio technology to communicate with the WTRUs 102a, 102b, 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment, the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management entity gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 140a, 140b, 140c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Wireless transmit/receive units (WTRUs) within a serving cell may make periodic or aperiodic intra-frequency, inter-frequency, and/or inter-radio access technology (RAT) measurements on the component carriers and report specific events like falling below or exceeding predefined thresholds back to the serving evolved Node B (eNB). In the following, a heterogeneous network is considered, which may consist of, for example, LTE macro cells and an underlay of femto-cells and/or pico-cells that may aggregate licensed and license-exempt (LE) bands. Macro cells may provide service continuity, while small cells, such as femto or pico-ells, may provide hot spot coverage. Such a heterogeneous network may rely on a coexistence database and mechanisms to enable operation with other secondary networks and users operating in LE bands. In contrast to the macro cells, the eNBs may operate both in the licensed spectrum and the LE spectrum. The eNBs may be connected to the Mobility Management Entity/Serving Gateway (MME/S-GW) and the operator's core network (CN) via the Internet, as well as to the Home eNB (HeNB) Management System (HeMS). The HeMS may be a 3GPP LTE Operation and Maintenance (OAM) entity, which may configure multiple eNBs and connect to the television White Spaces (TVWS) database and Coexistence Database (CDIS).

Examples of embodiments may be described herein with respect to 3GPP LTE R10 or LTE-Advanced (LTE-A), however, the embodiments may be applied to any type of wireless network. Additionally, the terms eNB and HeNB are used interchangeably, such that the aspects described herein may apply to both an eNB and a HeNB.

Figure 2:
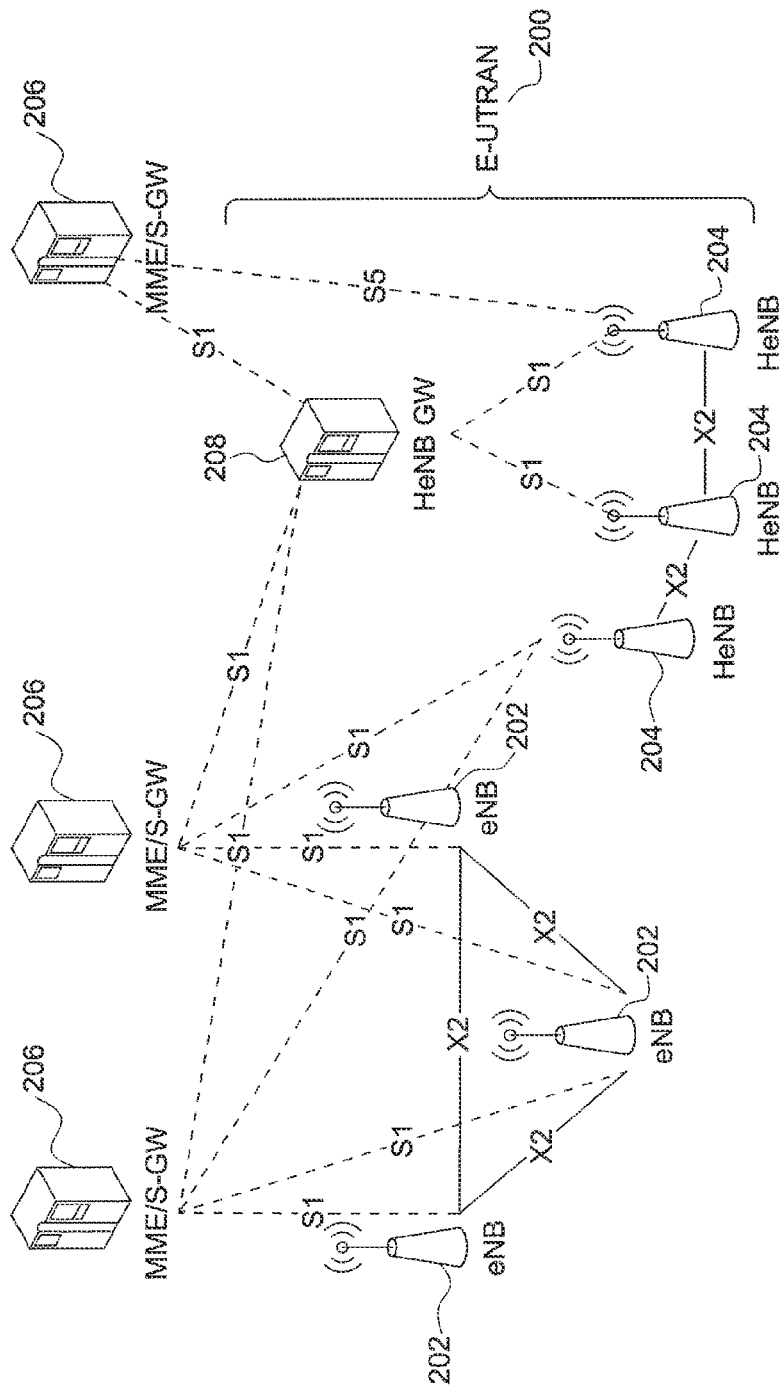
FIG. 2 is a system diagram of an example of an Evolved Universal Terrestrial Radio Access Network (E-UTRAN) architecture in which one or more disclosed embodiments may be implemented.

FIG. 2 is a system diagram of an example of an Evolved Universal Terrestrial Radio Access Network (E-UTRAN) architecture 200 in which one or more disclosed embodiments may be implemented. The E-UTRAN architecture 200 may include eNBs 202, HeNBs 204, and some CN entities including MME/S-GW 20-6, and HeNB gateway (HeNB GW) 208. Corresponding interfaces for the eNBs 202 and HeNBs 204 are shown, where interface X2 may be used between eNBs 202, and interfaces S1 or S5 may be used between the MME/S-GWs 206 and eNBs 202 and HeNBs 204. The embodiments herein may apply to small cells which include eNBs, Pico eNBs, and Remote Radio Heads (RRH), among other types of cells, and the WTRUs supported within these small cells.

Figure 3:
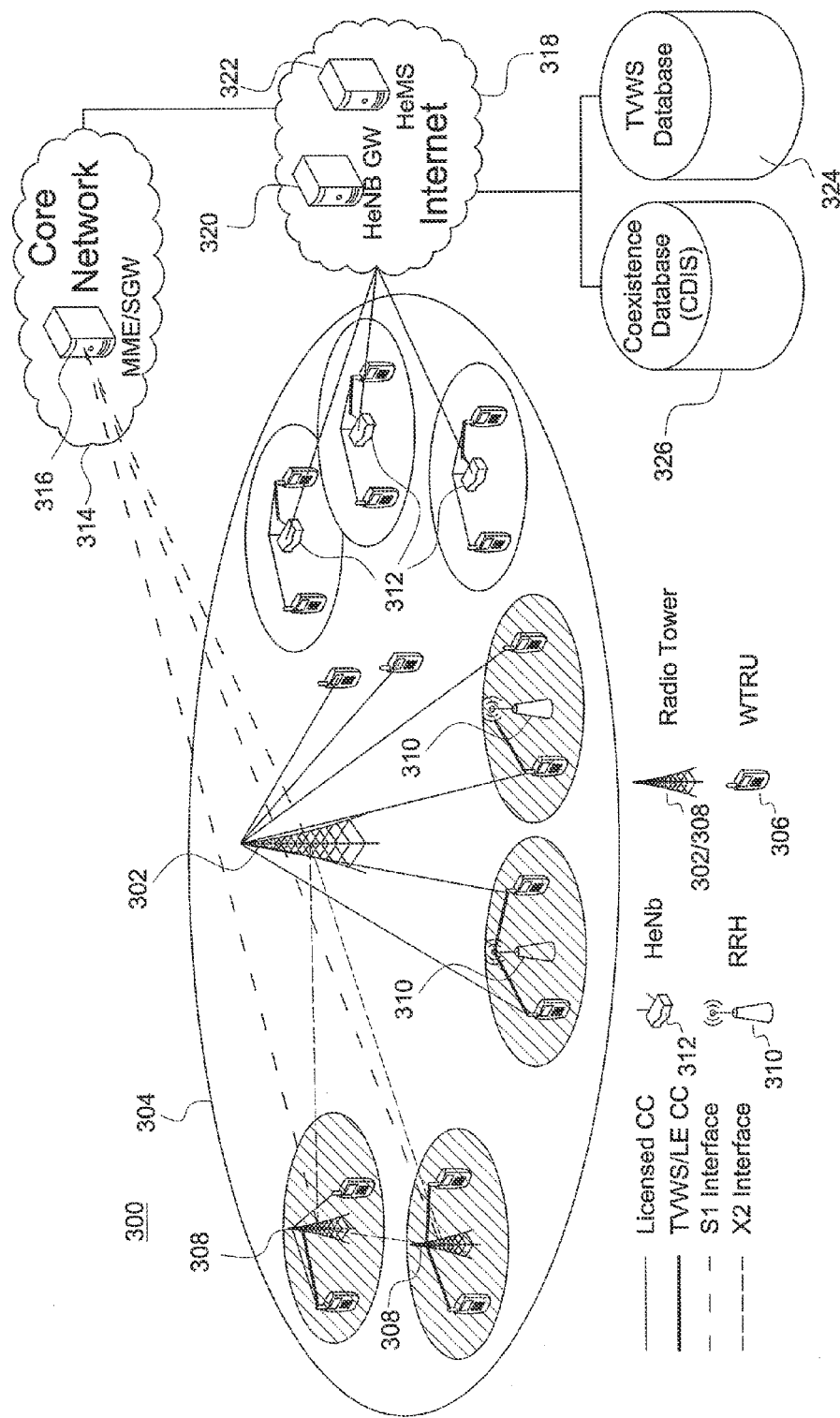
FIG. 3 shows a high-level system diagram of an example architecture 300 of small cells in a cellular system.

FIG. 3 shows a high-level system diagram of an example architecture 300 of small cells in a cellular system. A macro cell radio tower 302 has cell coverage area 304 and WTRUs 306 may communicate with the macro cell radio tower 302 using licensed spectrum. The macro cell 304 may contain many small cells from eNBs 308, RRHs 310, and HeNBs 312, for example. WTRUs 306 may communicate within the small cells with the eNB 308/RRH 310/HeNB 312, using licensed spectrum, and/or LE spectrum like TVWS or Industrial, Scientific, and Medical (ISM) bands.

A Coexistence Manager (CM) function (not shown) may be located in the HeNB Management System (HeMS 322, which maymanage inter-HeNB as well as inter-operator coexistence operation. The Coexistence Discovery and Information Service (CDIS) 326 is a database which may provide neighbor discovery service to CMs in the HeMS 322. Based on the geo-location provided, the CDIS 326 may respond with a list of CMs under which networks are operating at that specific location, as well as the contact information of those networks. TVWS usage information of secondary may could also be stored in the CDIS 326.

Sensing operation may be supported by the eNB 308. For example, a sensing processor (see FIG. 4) may be responsible for performing and processing sensing on LE spectrum and reporting the results to the Radio Research Management (RRM) entity (see FIG. 4). The sensing processor (i.e. cognitive sensing entity) and RRM are illustrated and discussed below with respect to FIG. 4. WTRUs 306 (i.e. client) may support the sensing processor capability in order to have access to a larger number of Supplementary Component Carriers (CCs).

An eNB 308 may have a backhaul connection to the TVWS database 324 via an MME/SGW 316 in a CN 314 and the Internet 318. Similarly, HeNBs 312 may connect to the TVWS database 324 via a HeNB GW 320 or HeMS 318, which may be connected to the Internet 318. The eNB 308 may be capable of supporting primary, secondary (licensed), and supplementary (license-exempt) channel communication. The HeNB 312 and the WTRU 306 may communicate with each other over licensed band only or over both licensed and license-exempt bands simultaneously.

As a first step in using the TVWS bands, the eNB 308 may periodically query the TVWS database 324 for available channels. It may then sense each of the vacant channels to determine if the channels are used by other secondary users or if they are vacant. If the channel is still empty, it may then set up the supplementary channel operation on those TVWS frequencies. If the channel is not empty (i.e., the sensing processor detects a primary user (PU), a secondary user (SU), or interference on those bands), then the sensing processor may report the same to the RRM module. The spectrum allocation entity (not shown) within the RRM module may assign the spectrum in the eNB's 308 cell based on some predefined criteria which may be proprietary to each operator/implementation.

In the idle mode, a WTRU 306 may be camped on a primary cell (licensed band) and may not yet be assigned any physical channel resources for communication. In this mode, the WTRU 306 may sense the LE spectrum to determine the presence or absence of any PU or interference due to SUs in the LE spectrum in the cell. The LE bands to sense at the WTRUs 306 may be a pre-determined span of spectrum including, but not limited to, TVWS (For example 512 MHz to 698 MHz) and ISM band (2.4 GHz) or Unlicensed National Information Infrastructure (U-NII) band (5 GHz). The sensing processor may sweep across the LE band and report (on the licensed uplink) its occupancy along with the LE band it corresponds to. The measurements, such as channel quality and sensing metrics, which may be made on the LE bands, may be periodically reported to the eNB 308 on the licensed uplink channels.

In the case where the telecommunication system may operate mainly on licensed carriers and may be complemented by an aggregation of supplementary carriers from the LE spectrum on a need basis, the supplementary carriers may be of different types. According to an example, the supplementary carrier may be a sublicensed channel, for example, a TVWS channel sublicensed to an operator for a specific geographical area and for a specific time that is not used by any PU or other SUs. For example, a channel originally owned by a DTV broadcast station may have been made available through agreement and/or brokerage. In another example, the supplementary carrier may be of type Secondary_User_Available, for example, a TVWS channel that is free and not occupied by a PU, but may be used by other SUs. In another example, the supplementary carrier may be of type Primary_User_Assigned, for example, a TVWS channel used by a PU, which may need SUs to leave the channel when the PU is detected. For the sublicensed carrier that is free from PUs and SUs, the carrier may be used as an LTE secondary cell (for example, as defined in LTE standard Release 10), in which case corresponding intra-frequency measurements to assess link quality may be the same as those used for a licensed carrier and may already be defined.

In the following, the eNB may be a mode II device and the WTRU may be a mode I device, as defined by the Federal Communications Commission (FCC). The eNB may or may not have sensing capability and may or may not operate as a sensing-only device, if needed. The WTRU may or may not have sensing capability.

According to an embodiment, in a cellular network operating over white space spectrum or other dynamic and shared spectrum, the eNB and the WTRU may monitor and sense spectrum occupancy to detect the presence of PUs or other SUs possibly using other radio access technologies (RATs) and opportunistically access vacant white space spectrum. However, existing LTE systems may measure the signal quality of the LTE system and may not assume that other RATs may occupy the same channel. Existing LTE systems may not be capable of assessing primary or secondary usage, or have supporting measurement quantities, configuration, and reporting procedures. According to another embodiment, a cellular system may silence all the WTRUs and eNBs in a cell every so often and expect specific types of measurements to be reported back from the sensing device and with certain reporting schedules.

Other embodiments may mitigate the fact that an unsynchronized silence period across neighbor cells operating on the same channel may occur, as well as latency issues related to reporting sensing measurement to the target eNB after a handover. These and other embodiments are described in detail below.

To detect weak PU signals below the noise floor on the white space spectrum, active channel sensing may be performed, which may need scheduling of periodic gaps in transmission between the eNB and the WTRUs in a synchronized fashion, so that spectrum sensing may be performed during these gaps to determine PU occupancy and possibly other SU occupancy patterns without interference from the eNB's or WTRU's own transmission.

For cellular systems where sensing for PUs (incumbents of the spectrum as allocated by a regulator like the FCC) and SUs (i.e., other non-incumbents of the spectrum as allocated by a regulator like the FCC) in the spectrum may not be supported, signaling enhancements may be used to enable sensing measurement configuration and reporting procedures to enable efficient use of LE spectrum involving sensing measurement gap scheduling, sensing metric reporting configuration, and handling coexistence with SUs, among other things.

In an example, consider the case when the serving eNB and neighbor eNBs configure the same LE channel as a supplementary CC in their respective cells. The sensing measurement gap configurations on the LE channel may be expected to be different for each cell, for example using an on/off period and/or duty cycle. Also, on each of the supplementary channels, the sensing measurement gap configuration may change in a semi-static or dynamic fashion. Unsynchronized silent period configurations across neighbor LE supplementary channels may cause interference and impact detection sensitivity of the sensing algorithms at WTRUs in the serving cell, thus impacting robust detection of weak PUs in the LE channel (e.g., DTV or wireless microphone detection at −114 dBm). Accordingly, these sensing measurement gap configurations may be synchronized across neighbor cells, so that a strong neighbor cell signal at the WTRU may not impact sensing performance on the LE channel during a sensing measurement gap scheduled by the eNB.

In another example, consider the case when the serving eNB and neighbor eNBs operate on the same or different LE channels as the active supplementary CCs in their respective cells. Mobile WTRUs moving towards a neighbor cell may detect a strong measurement from the neighbor cell and may report the event to the eNB. The eNB may eventually trigger a handover to that cell. In LTE Release 10, when a WTRU is moving across cells supporting carrier aggregation, the secondary cells (SCells) may be deactivated during handover.

In the case where all cells may be kept active during handover, when the handover of a WTRU to a target cell is initiated and completed, there may be a signaling latency in initiating a sensing operation by the target eNB at the WTRU and in sensing and reporting the latency by the WTRU back to the eNB. The sensing latency may come from the fact that algorithms in the sensing toolbox at the WTRU have to be reset, so that any history of sensing measurements from the serving cell may be reset and fresh filtering of measurements specific to the target cell coverage area may be started. In such a case, the algorithms in the sensing toolbox at the WTRU may need a finite convergence time for the sensing results to be reliable.

This signaling and processing latency may be relevant when the WTRUs in handover are running an application assigned with high Quality of Service Class Identifier (QCI) radio bearers, while the target eNB is a hot spot serving a large number of users simultaneously, and thus may be heavily utilizing the licensed spectrum, making it necessary to activate supplemental CCs (SuppCCs) to relieve congestion.

LTE Release 10 may not require the target eNB to request link quality measurements such as received signal strength indicator (RSSI) or reference signal received power (RSRP), on the SuppCCs by the WTRU before activation of SuppCCs at the WTRU. When SuppCC activation is considered, some prior measurement information may be needed. Since SuppCC activation is contingent upon knowledge of PU occupancy for incumbent protection and SU occupancy for coexistence in the WTRU's vicinity, the target eNB may need the WTRU to provide this information proactively to the target eNB so that SuppCC activation may be determined by the target eNB seamlessly during handover. Signaling mechanisms, such as those discussed below, may reduce the latency in reporting sensing measurements to the target eNB after handover.

Another issue that may arise is that unsynchronized gaps may occur across SuppCCs using the same radio front end and originating from the same eNB. When multiple SuppCells are allocated at an eNB, each SuppCell may have a different measurement gap duty cycle. Some of the SuppCells may share the same radio front end, i.e. the same spectral band. Sensing on SuppCells sharing the same radio front end may encounter the issue of self-interference when active communication is enabled on one SuppCell sharing the radio front end at the same time as a measurement gap is enabled on the other SuppCell(s). The self-interference may be caused by signal leakage from one channel into another, which may impacts the quality of measurements during the measurement gap. According to an embodiment, discussed in detail below, the measurement start and stop times may be coordinated to avoid self-interference issues and measurement reporting schedules may be established in multiple SuppCell scenarios.

The embodiments disclosed herein include protocol and signaling enhancements to cellular standards to support spectrum sensing and sensing measurement gap scheduling for enabling opportunistic use of License Exempt (LE) bands as supplementary component carriers.

According to an embodiment, a protocol stack and message sequence may be defined to support sensing. An architecture for the WTRU and the eNB may integrate sensing features to support PU detection and SU characterization. The signaling sequence may be provided for initial/candidate sensing at the WTRU and the eNB, as well for active channel sensing. According to an example embodiment, methods may integrate sensing measurement procedures in the LTE protocol stack.

Figure 4:
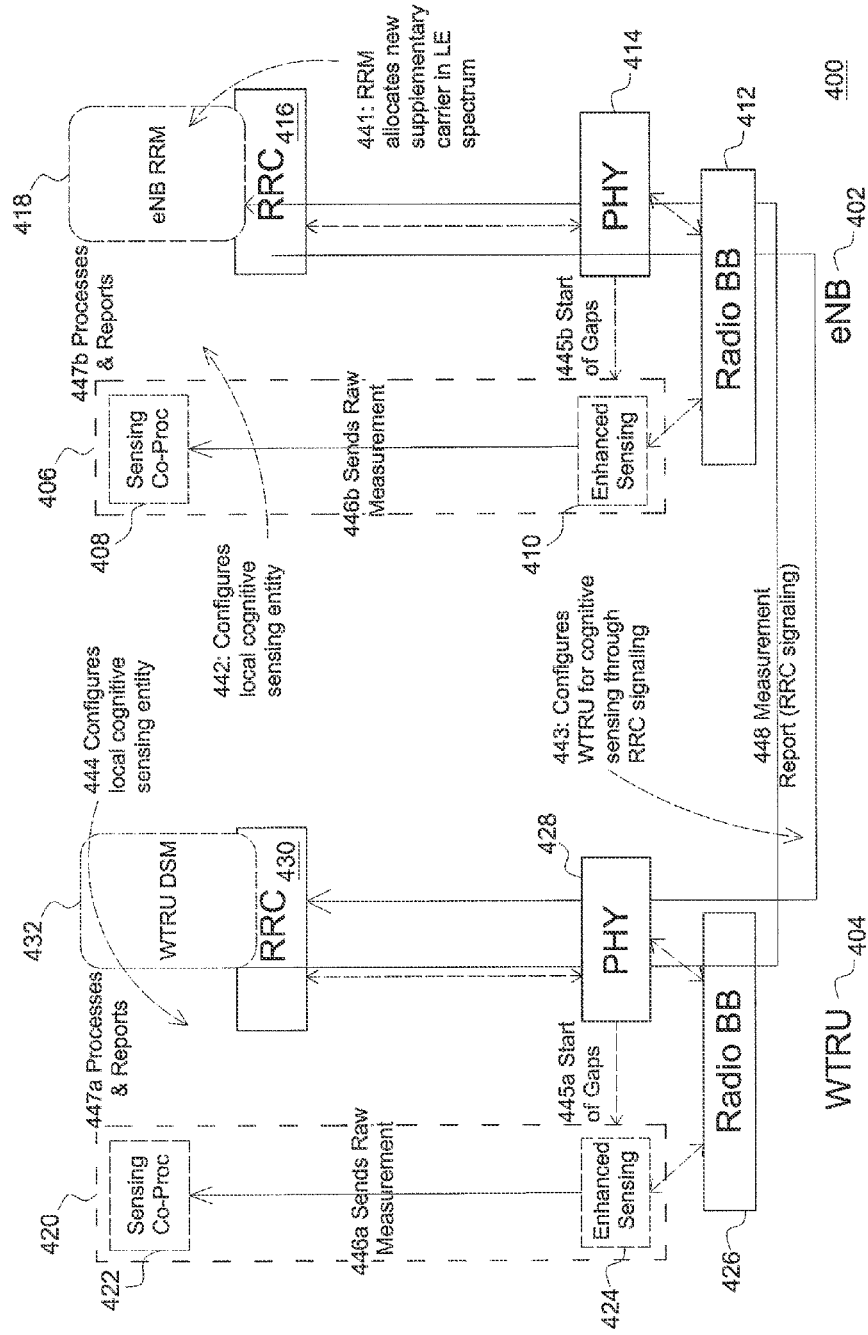
FIG. 4 shows an example of a long term evolution (LTE) protocol stack supporting sensing at the evolved Node B (eNB) and the wireless transmit/receive unit (WTRU)

FIG. 4 shows an example of an LTE protocol stack 400 supporting sensing at the eNB 402 and the WTRU 404. FIG. 4 shows LTE nodes, functions, and entities that may be involved in the enhanced measurements to support operation in a LE spectrum, such as TVWS for example. Not all nodes, functions and entities are shown. The eNB 402 may include a cognitive sensing entity 406, which may include two sub-components: the sensing co-processor 408 and the enhanced sensing physical layer (PHY) 410. The eNB 402 may also include radio baseband (BB) 412, PHY 414, RRC 416, and eNB RRM 418. Similarly, the WTRU 404 may include a cognitive sensing entity 420, which may include two sub-components: the sensing co-processor 422 and the enhanced sensing physical layer (PHY) 424. The WTRU 404 may also include a radio BB 426, a PHY 428, an RRC 430, and a WTRU dynamic spectrum management (DSM) entity 432 (also called the WTRU RRM entity, equivalent to the eNB RRM entity 418).

Any of the following steps or procedures may be performed in the protocol stack 400. The eNB RRM entity 418 may allocate new supplementary carrier in the LE spectrum, 441. The sensing co-processor 408 together with the eNB RRM 418 may set the configuration for the cognitive sensing entity 406. The eNB 402 may configure the WTRU 404 for cognitive sensing through RRC signaling, 443, between the RRC entities 416 and 430.

The eNB 402 cognitive sensing entity 406 may be responsible for performing and processing cognitive sensing on the LE spectrum and reporting the results to the eNB RRM entity 418. A cognitive sensing entity 420 may also be integrated in the WTRU 404, and may be responsible for performing cognitive sensing on the TVWS and other LE spectrum; the results may be processed and reported, 447a, to a DSM (i.e. RRM) entity 432.

The sensing co-processors 408 and 422, in the eNB 402 and WTRU 404 respectively, may configure the enhanced sensing PHY 410 and 424, repectively, and may process the raw sensing results. The cognitive sensing may occur during measurement gaps where no downlink and uplink transmissions are scheduled. During specific measurement gaps, the enhanced sensing PHY 410 and 424 may make measurements while temporarily taking control of the broadband radio 412 and 426, respectively.

Enabled by the RRM entity 418 and 432, the RRC 416 and 430 may configure and activate the measurement gaps. Also enabled by the RRM entity 418 and 432, the RRC layers 416 and 430 may make use of the existing RRC signaling procedures for the communication between the eNB 402 and the WTRU 404 to provide measurement reports 448 for cognitive sensing in terms of measurement configuration and reporting. Example methods of using RRC signaling are described below.

Once the enhanced measurements configuration is received at the WTRU, the WTRU dynamic spectrum management (DSM) enhanced measurements entity configures the co-located cognitive sensing entity at the WTRU similar to the way the eNB configures its co-located cognitive sensing entity. Once the eNB and the WTRU are coordinated to start a silent period/measurement gap, the LTE PHY may signal the start and duration of measurement gaps to the enhanced sensing component and release control of the broadband radio. Alternatively, the enhanced sensing component may autonomously be synchronized with the LTE PHY on the start of the duration of measurement gaps.

After performing the enhanced measurement during the gaps, the same way that the sensing co-processor of the eNB processes measurements and sends the processed results to the eNB RRM, the sensing co-processor of the WTRU processes measurements and sends processed results to the WTRU-supporting RRM. The WTRU may then report the enhanced measurements result to the eNB through RRC signaling.

Figure 5:
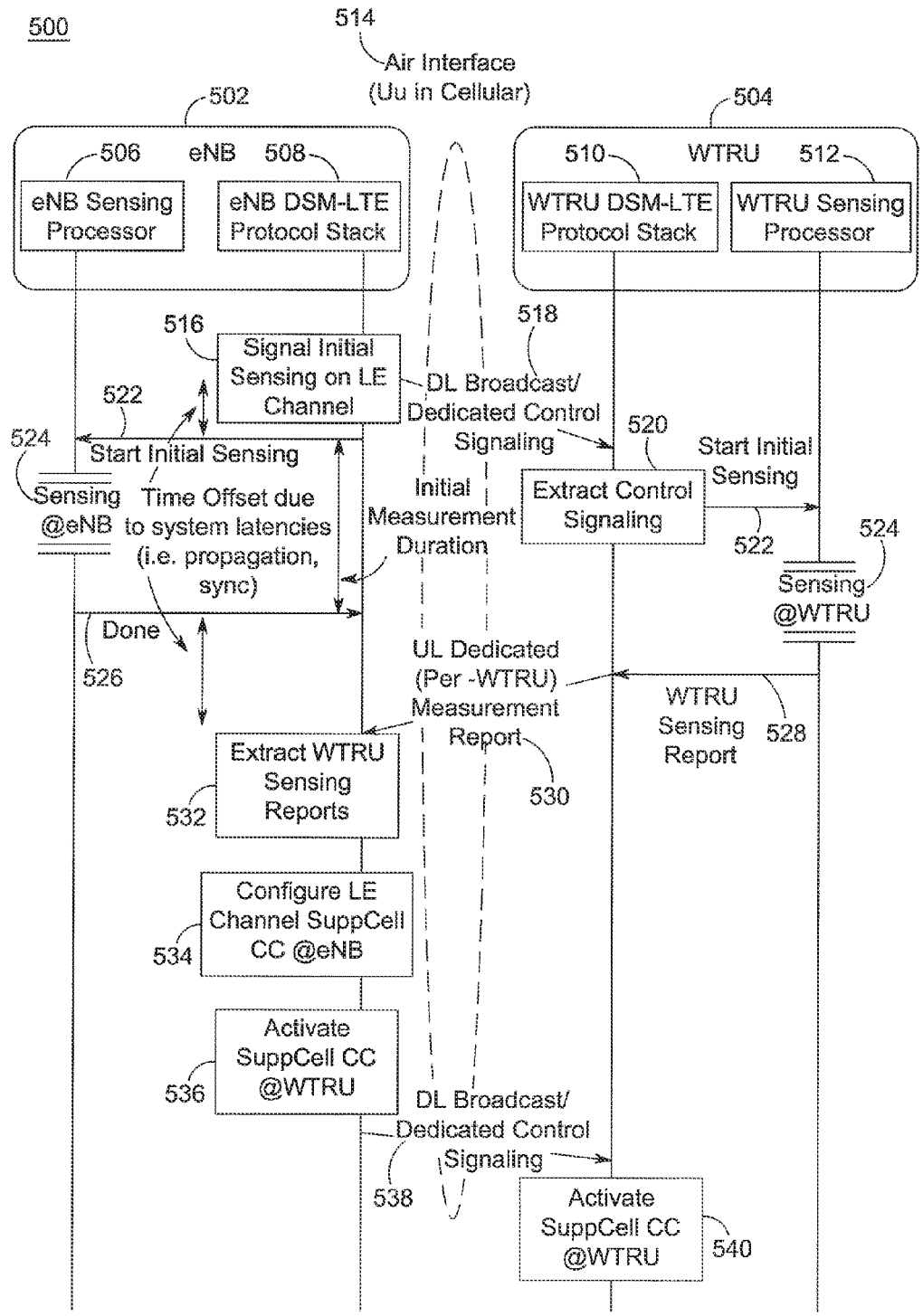
FIG. 5 shows a signaling diagram of an example signaling sequence between the sensing processor and the dynamic spectrum management (DSM) LTE protocol stack, within the eNB and WTRU, respectively, for the case of initial/candidate sensing.

FIG. 5 shows a signaling diagram of an example signaling sequence 500 between the sensing processor 506 and 512 (which may include enhanced sensing and sensing co-processor combined) and the DSM LTE protocol stack 508 and 510, within the eNB 502 and WTRU 504, respectively, for the case of initial/candidate sensing. Initial channel sensing may be performed before a LE channel is configured as a supplementary CC by the eNB 502 to assess the presence of PUs or SUs in the system. Candidate channel sensing may be performed on a backup channel (e.g., a channel that is not yet allocated to the eNB 502 for operation) by the eNB 502 and the WTRU 504 to sense and assess the channel occupancy of the backup channel. The communication between the eNB 502 and WTRU 504 is over an air interface 524, for example a Uu interface in cellular networks.

The following call flow for initial signaling may be used to assess the occupancy of a LE channel using sensing measurements at the eNB 502 and at the WTRU 504. When the sensing measurement indicates that the channel is available, the eNB 502 may set up a SuppCell operation on that channel. The eNB 502 may signal initial sensing on the LE channel, 516, and then may send DL broadcast or dedicated control signaling 518 to the WTRU 504. The WTRU 504 (in the DSM-LTE protocol stack 510) may extract the control signaling 520, and both the eNB 502 and WTRU 504 may start the initial sensing, 522, in the corresponding sensing processors 506 and 512, which may then perform sensing 524. The eNB sensing processor 506 may send a notification signal, 526, to the eNB DSM-LTE protocol stack 508 to notify when it is done with sensing. The WTRU sensing processor 512 may send a WTRU sensing report, 528, to the WTRU DSM-LTE protocol stack 510, which may then send an UL dedicated (per-WTRU) measurement report, 530, to the eNB 502. The eNB DSM-LTE protocol stack may extract the sensing reports, 532, configure LTE channel SuppCell CCs at the eNB, 534, activate suppCell CCs for the WTRU, 536, and send a DL broadcast or dedicated control signaling message, 538, to the WTRU 504 so that the WTRU 504 may activate its suppCell CCs, 640.

Figure 6A:
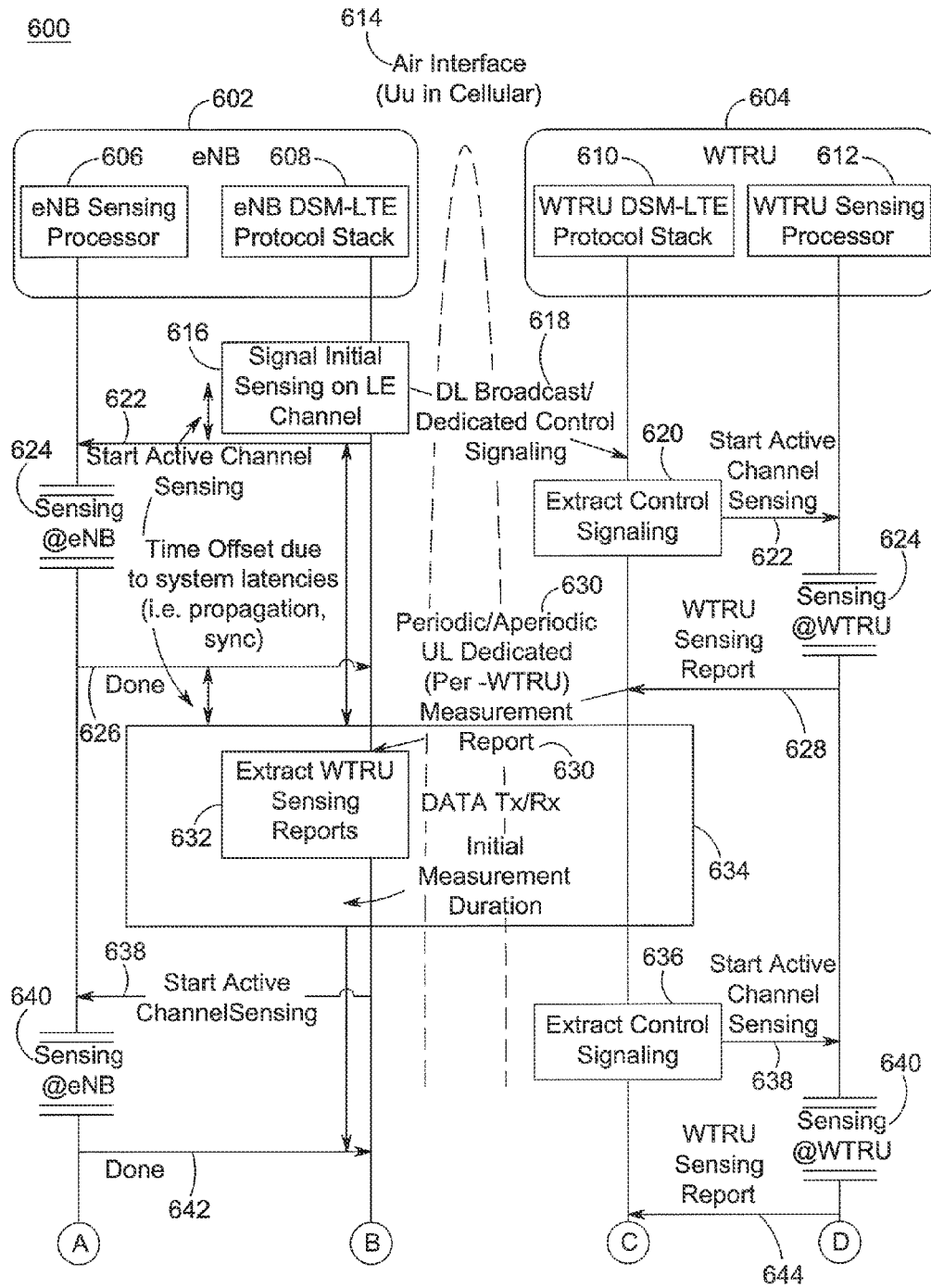
FIGS. 6A and 6B show a signaling diagram of an example signaling sequence between the sensing processor and the DSM LTE protocol stack, within the eNB and WTRU, respectively, for the case of active channel sensing.
Figure 6B:
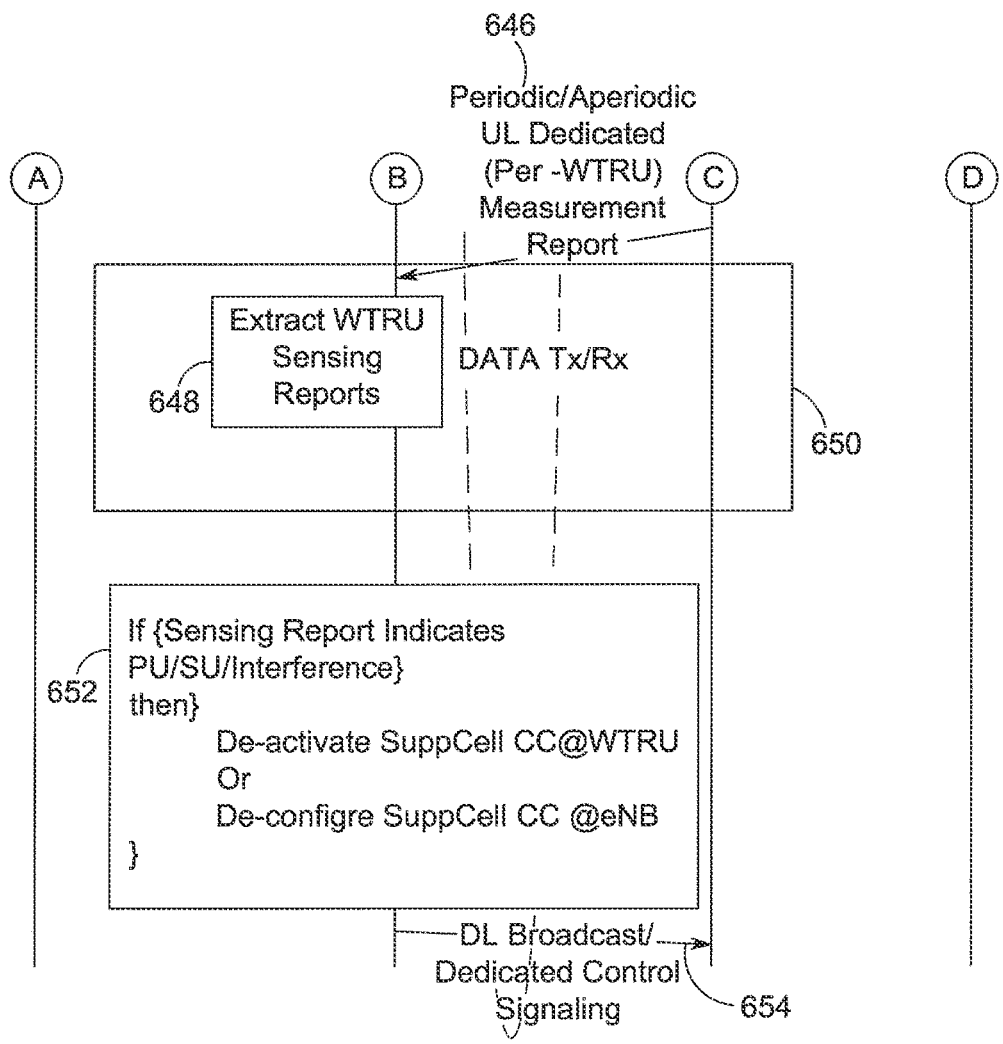

FIGS. 6A and 6B show a signaling diagram of an example signaling sequence 600 between the sensing processor 606 and 612 (which may include enhanced sensing and sensing co-processor combined) and the DSM LTE protocol stack 608 and 610, within the eNB 602 and WTRU 604, respectively, for the case of active channel sensing. Active channel sensing may be performed on a LE channel that is configured as a supplementary CC by the eNB 502 to assess the presence of PUs or SUs in the system. The sensing may be done by scheduling periodic/aperiodic gaps in transmission. The gap schedule may be determined by the eNB 602 and may be signaled to the WTRU 604. The communication between the eNB 602 and WTRU 604 is over an air interface 614, for example a Uu interface in cellular networks.

The eNB 602 may signal active channel sensing on the LE channel, 616, and then may send DL broadcast or dedicated control signaling 618 to the WTRU 604. The WTRU 604 (in the DSM-LTE protocol stack 610) may extract the control signaling 620, and both the eNB 602 and WTRU 604 may start the active channel sensing, 622, in the corresponding sensing processors 606 and 612, which then perform sensing 624. The eNB sensing processor 606 may send a notification signal, 626, to the eNB DSM-LTE protocol stack 608 to notify when it is done with sensing. The WTRU sensing processor 612 may send a WTRU sensing report, 628, to the WTRU DSM-LTE protocol stack 610, which may then send an UL dedicated (per-WTRU) measurement report, 630, to the eNB 602. The eNB DSM-LTE protocol stack 608 may extract the sensing reports, 632, during a data transmit/receive (tx/rx) period 634.

The WTRU 604 may extract control signaling, 636, and the eNB 602 and WTRU 604 may start active channel sensing 630. Upon completing of the active sensing period, 640, the eNB sensing processor 606 may notify, 642, the eNB DSM-LTE protocol stack 608 that it is done, and the WTRU sensing processor 612 may send a WTRU sensing report, 644, to the WTRU DSM-LTE protocol stack 610. The WTRU 604 may send a periodic or aperiodic UL dedicated (per-WTRU) measurement report, 646, to the eNB, which may extract the WTRU sensing report, during a data tx/rx period 650. In decision step 652, the eNB DSM-LTE protocol stack 608 may determine that if the sensing report indicates a PU or SU interference, then it may de-active the SuppCell CCs of the WTRU 604, or de-configure the SuppCell CCs of the eNB 602. The eNB 602 may send a DL broadcast or dedicated control signaling message 654 to the WTRU 604 to notify it if the de-activation.

At the eNB, the RRM may configure the collocated cognitive sensing entity for a specific supplementary carrier. The eNB RRM may inform the cognitive sensing entity on the list of all the enhanced measurements it must perform. Once the sensing measurements are configured at the eNB and the eNB activates the cell on the allocated LE carrier, the eNB may start performing the cognitive sensing.

The RRM at the eNB may configure a set of WTRUs that are in connected mode and that have the cognitive sensing capability for the enhanced measurements. The WTRU capability transfer procedure (to the eNB) may include the cognitive sensing capability of the WTRU. This procedure may occur at the initial WTRU connection to the network or, as an update, when the cognitive sensing capability is deactivated or activated dynamically during operation. For example, when the battery power is low at the WTRU, the WTRU may decide to deactivate the cognitive sensing capability and vice-versa.

When a sensing capability is deactivated at a WTRU, the eNB may stop scheduling the WTRU on the LE carriers, for example, in the case that the carrier is Primary_User_assigned. The eNB may use existing RRC signaling to configure the WTRUs with the enhanced measurements. The configuration information that may be transferred to the WTRUs may include the same configuration information used to configure the co-located cognitive sensing entity at the eNB. However, the values may be different, especially for the reporting periods between the WTRUs and the eNBs.

Two example embodiments of reusing existing RRC signaling for the eNB to configure the WTRU with the enhanced measurements, as well as for the WTRU to report the different enhanced measurements results are described below.

According to an embodiment, the RRM may include enhanced measurements procedures for sensing. An eNB RRM enhanced measurements management entity may be defined as well as a WTRU DSM measurement supporting entity, both of which may be on top of the RRC layer. The communication between these WTRU and eNB RRM entities in terms of control and the reporting is performed through specific signaling. The enhanced measurements configuration/control information may be encapsulated in a standardized DLInformationTransfer RRC message that may be sent to the set of WTRUs. The enhanced measurements reporting from the WTRU DSM enhanced measurements entity to the eNB RRM enhanced measurements management entity may be encapsulated in the standardized ULInformationTransfer RRC message.

For the DLInformationTransfer RRC message that encapsulates the WTRU measurement configuration, the information element "dedicatedInfoType" of the DLInformationTransfer message may be enhanced to include a new value (for example, "dedicatedInfoRRM") so that the message will be forwarded to WTRU DSM enhanced measurements entity at the WTRU.

The encapsulated WTRU measurement configuration may include, but is not limited to, any of the following information that may depend on the channel/carrier type, including Secondary_User_Available and Primary_User_Assigned. For example, for the Secondary_User_Available carrier that is open to SUs, the LTE system may have a different operation on that supplementary carrier. The LTE system may coexist with these SUs by not accessing the carrier when a SU is occupying the carrier and may introduce silent periods (i.e. coexistence gaps where no downlink and uplink transmissions are scheduled) to share the carrier with SUs. For that purpose, the LTE system may optionally require the following additional measurement quantities to support that coexistence: Secondary_User_Characterization; events reporting triggered by detecting a certain RAT; and Listen_Before_Talk_SuccessRate (LBT_SR).

The Secondary_Users_Carrier_Usage information may carry a sensing percentage of time the carrier may be used by other SUs. These measurements may be used by RRM algorithms to escape the carrier when SUs are highly occupying the carrier or to reduce the LTE usage of that carrier. When the SUs are not present or there is a low usage of the carrier, the RRM algorithms may increase the LTE usage of the carrier. The Secondary_User_characterization information may consist of identifying SUs' technologies. The RRM may use this measurement to decide to continue using the carrier (when the SUs' technologies are friendly, coexistent typically when based on a carrier sense multiple access (CSMA) based approach) or vice-versa. For events reporting triggered by detecting a certain RAT, for example, a WTRU may be configured to sense and report the detection of a specific RAT used by a SU within a certain threshold of received output power.

For LBT_SR, for the purpose of coexistence with SUs, the LTE system operating in a LE carrier may avoid accessing a carrier when it is already occupied by a SU. Hence, an LTE transmitting node may optionally perform sensing to detect any SU presence before starting to use the carrier. Statistics on the success rate of the Listen_Before_Talk (LBT), which may correspond to the success rate of accessing the carrier, may be maintained and transmitted to the RRM. The RRM algorithms may use this measurement result in assessing whether the presence of SUs in the carrier is acceptable to continue operation on that LE carrier. The LBT may be applicable for the eNB when scheduled to transmit in the downlink and may only applicable to WTRUs when scheduled to transmit in the uplink.

The Primary_User_Assigned carrier may include the same characteristic of a Secondary_User_Available carrier and in addition, PUs (like in TVWS channels) may be present on the carrier. A device operating on a TVWS channel, which is Primary_User_Assigned, may have a sensing capability for PU detection. The device may escape from the carrier when a PU is detected. To support this operation, in addition to the measurement entities defined for the Secondary_User_Available carrier, the Primary_User_Detection measurement entity may characterize the presence of specific RF signals (like microphone RF signals, for example).

The measurement configuration may also include, but is not limited to, the accompanying information like channel ID, reporting criteria, and channel category (i.e. an active channel that is being allocated and used or a candidate channel that is not yet allocated but monitored for future use).

Once the enhanced measurements configuration is received at the WTRU, the WTRU DSM enhanced measurements entity may configure the co-located cognitive sensing entity at the WTRU to the way the eNB configured its co-located cognitive sensing entity. After the enhanced measurements are configured at a specific WTRU, the WTRU may start performing the cognitive sensing.

When the enhanced measurement reporting criteria are met, the WTRU-supporting RRM may send the sensing result to the eNB RRM. The reporting results may be encapsulated in the standardized ULInformationTransfer RRC message. In this case, the information element "dedicatedInfoType" of the ULInformationTransfer message may be enhanced and include a value (for example, "dedicatedInfoRRM"), so that the message will be forwarded to the eNB RRM enhanced measurements management entity.

According to another embodiment, the enhanced measurements procedures may be integrated within the existing RRC measurement procedures, such that the RRC measurements signaling may support additional measurements. Hence, the dedicated RRC message to configure measurements, namely, the RRCConnectionReconfiguration message may be enhanced and may include in the information element MeasConfig (that may specify the measurements to be performed by the WTRU) the enhanced measurements configuration information listed above.

The sensing measurement configuration may include, but is not limited to, any of the following parameters. For example, the sensing measurement object(s) may refer to objects on which the WTRU may perform sensing measurements. A sensing measurement object may be a single LE channel on which a supplementary cell may operate, and may consists of the following parameters: WS_chan_ID, which may be the channel index of a LE spectrum band based on a predefined mapping; and Chan_Type, which may indicate whether the channel is active or is a candidate channel.

Sensing Measurement Object ID (SensMeasObj_ID) may be a parameter that refers to the object ID corresponding to a sensing measurement object. Table 1 shows examples of values for the paramters SensMeasObj_ID, WS_chan_ID and Chan_Type.

TABLE 1

| SensMeasObj_ID | WS_chan_ID | Chan_Type |
| --- | --- | --- |
| 1 | 1 | Active |
| 2 | 1 | Candidate |
| 3 | 2 | Active |
| 4 | 2 | Candidate |
| 5 | 3 | Active |
| 6 | 3 | Candidate |

Sensing Reporting configurations may be a list of reporting configurations, where each reporting configuration may consist of a reporting criterion, a reporting format, and reporting quantities. The reporting criterion may be the criterion that triggers the WTRU to send a measurement report. This may either be periodic or a single event description. For example, the criterion may be one of the events in the event list in Table 2, such that each criterion may have an associated event ID. The Action column indicates possible actions that the system may take based on the detection of the event and is not signaled.

TABLE 2

| Event ID | Event | Action |
| --- | --- | --- |
| S1a | DTV Detection on Active Channel | WTRU reports event to eNB and eNB evacuates channel |
| S1b | Wireless Mic. Detection on Active Channel | WTRU reports event to eNB and eNB evacuates channel |
| S1c | Wi-Fi SU Detection on Active Channel % Utilization < Threshold | WTRU reports event to eNB and eNB continues operation in channel with/without coexistence |
| S1d | Wi-Fi SU Detection on Active Channel % Utilization > Threshold | WTRU reports event to eNB and eNB will coexist/evacuate channel |
| S1e | LTE SU Detection on Active Channel % Utilization < Threshold | WTRU reports event to eNB and eNB continues operation in channel with/without coexistence |
| S1f | LTE SU Detection on Active Channel % Utilization > Threshold | WTRU reports event to eNB and eNB will coexist/evacuate channel |
| S1g | Interference Detection on Active Channel % Utilization < Threshold | WTRU reports event to eNB and eNB continues operation in channel with/without coexistence |
| S1h | Interference Detection on Active Channel % Utilization > Threshold | WTRU reports event to eNB and eNB will coexist/evacuate channel |
| S2a | DTV Detection on Alternate Channel | WTRU reports event to eNB and eNB evacuates channel |
| S2b | Wireless Mic. Detection on Alternate Channel | WTRU reports event to eNB and eNB evacuates channel |
| S2c | Wi-Fi SU Detection on Alternate Channel % Utilization < Threshold | WTRU reports event to eNB and eNB continues operation in channel with/without coexistence |
| S2d | Wi-Fi SU Detection on Alternate Channel % Utilization > Threshold | WTRU reports event to eNB and eNB will coexist/evacuate channel |
| S2e | LTE SU Detection on Alternate Channel % Utilization < Threshold | WTRU reports event to eNB and eNB continues operation in channel with/without coexistence |
| S2f | LTE SU Detection on Alternate Channel % Utilization > Threshold | WTRU reports event to eNB and eNB will coexist/evacuate channel |
| S2g | Interference Detection on Alternate Channel % Utilization < Threshold | WTRU reports event to eNB and eNB continues operation in channel with/without coexistence |
| S2h | Interference Detection on Alternate Channel % Utilization > Threshold | WTRU reports event to eNB and eNB will coexist/evacuate channel |
| E1a | Neighbor SuppCell Meas Gap Start | WTRU reports event to eNB and eNB starts transmission (or sensing measurement gap) on serving SuppCell |
| E1b | Neighbor SuppCell Meas Gap End | WTRU reports event to eNB and eNB ends transmission (or sensing measurement gap) on serving SuppCell |
| E1c | Listen_before_Talk(LBT) Coexistence Gap Indication | WTRU reports event to eNB end eNB starts transmission (or sensing measurement gap) on serving SuppCell |

The reporting format may refer to the format of the type of interferer, if any, detected by the sensing processor on the channel that the WTRU includes in the measurement report. For example, the report format may include any of the following information: Channel Occupancy, which may indicate Vacant or Occupied; PU detection, which may indicate True or False; PU Type, which may indicate Type 1, Type 2, None, etc. (for example, the type values may correspond to DTV, Wireless Microphone, and None for TVWS channels); SU detection which may be True or False;

and SU Type, which may indicate one of Wi-Fi, LTE, Other Interferer, or None (or other SU).

The reporting quantities may include the quantities that the WTRU may include in the measurement report and associated information. In the following, examples of quantities are described, although other quantities not listed may be included, and all the values are provided for illustrative purposes such that other values may be used. The Prob_misdetection quantity may include, for example, 20 indices to indicate utilization in steps of 5%, i.e., 0%-5%=0; 5%-10%=1; etc. The Prob_falsealarm quantity may include, for example, 20 indices to indicate utilization in steps of 5%, i.e., 0%-5%=0; 5%-10%=1; etc. The SU % Utilization Index quantity may include, for example, 20 indices to indicate utilization in steps of 5%, i.e., 0%-5%=0; 5%-10%=1; etc. The SU % Utilization Threshold quantity may include, for example, 20 indices to indicate utilization in steps of 5%, i.e., 0%=0; 5%=1; 10%=2; etc.

As for timing, $\tau_1$ may be a time stamp with respect to the system frame number (SFN) at which neighbor SuppCell measurement may fall below a low_thresh threshold. Time duration $\tau_2$ may be a time duration between consecutive time stamps with respect to the SFN at which the neighbor SuppCell measurement falls below low_thresh. Time stamp $\tau_3$ may be a time stamp with respect to the SFN (immediately following $\tau_1$) at which the neighbor SuppCell measurement goes above low_thresh. These timing quantities are described further below. dLBT_SR, or Listen_before_talk_Success_Rate, as discussed previously, may provide an indication of a percentage of time the LE channel was found busy by the LBT algorithm.

Another example of a configuration parameter for sensing measurement configuration is the Sensing Reporting Configuration ID (or SensRepConfig_ID), which is an object ID corresponding to a reporting configuration, examples of which are given in Table 3 for different channel occupancy, PU detection, PU type, SU detection, SU type, and event ID.

TABLE 3

| SensRepConfig_ID | Channel Occupancy | PU Detection | PU Type | SU Detection | SU Type | Event ID |
|---|---|---|---|---|---|---|
| 0 | Vacant | False | None | False | None | None |
| 1 | Occupied | True | Type 1 | False | None | S1a |
| 2 | Occupied | True | Type 2 | False | None | S1b |
| 3 | Occupied | False | None | True | Wi-Fi | S2c |
| 4 | Occupied | False | None | True | LTE | S2f |
| 5 | Occupied | False | None | True | Other Interferer | S2h |

In another example, the Sensing Measurement Gap Schedule parameter may define periods that the WTRU may use to perform sensing, where (UL, DL) transmissions may not be scheduled. The Sensing Measurement Gap Schedule may be configured by the eNB and may be signaled to the WTRU, including Duty Cycle in the order of sub-frames and On Duration in the order of sub-frames.

In another example, the Sensing Measurement Gap ID (SensMeasGap_ID) may be the object ID corresponding to a Sensing Measurement Gap, examples of which are given in Table 4 for different duty cycles and off durations. For example, SensMeasGap_ID value "0" may apply to a candidate channel where there are no measurement gaps.

TABLE 4

| SensMeasGap_ID | Duty Cycle (in milliseconds) | OFF Duration (in milliseconds) |
|---|---|---|
| 0 | NA | NA |
| 1 | 1 | 1 |
| 2 | 5 | 1 |
| 3 | 10 | 1 |
| 4 | 20 | 1 |

In another example, the Sensing Measurement ID (SensMeas_ID) parameter may be used to identify a sensing measurement configuration, for example, by linking a sensing measurement object ID, sensing reporting configuration ID and sensing measurement gap ID: SensMeas_ID→[SensMeasObj_ID, SensRepConfig_ID, SensMeasGap_ID].

According to another embodiment, configuration information elements may be signaled over system information elements using MIB/SIBs and broadcast to the whole cell, or may be signaled using dedicated RRC signaling to each WTRU, or may be sent over MAC control elements for each WTRU. IE SensMeasConfig may be used to specify sensing measurements to be performed by the WTRU and signaled by the E-UTRAN, and may indicate channels to sense, as well as the configuration of sensing measurement gaps. Table 5 shows examples of fields and their descriptions for the SensMeasConfig IE.

TABLE 5

| SensMeasConfig Field Description |
|---|
| sensreportConfigToAddList |
| List of sensing measurement reporting configurations to add. |
| sensmeasIDToAddList |
| List of sensing measurement identities to add. |
| sensmeasObjectToRemoveList |

TABLE 5-continued

| SensMeasConfig Field Description |
|---|
| List of sensing measurement objects to remove. |
| sensreportConfigToRemoveList |
| List of sensing measurement reporting configurations to remove. |
| sensmeasIDToRemoveList |
| List of sensing measurement identities to remove. |
| sensmeasGapConfig |
| Used to setup and release sensing measurement gaps. |
| sensmeasGapID |
| Used to indicate sensing measurement gap pattern. |
| sensNeighMeasThresh |
| Used to signal high_thresh and low_thresh to WTRUs for detection of gap patterns on neighbor SuppCell |

The SensMeasGapConfig IE may be used to specify the sensing measurement gap configuration and controls setup/release of sensing measurement gaps. This IE may include a release_setup field, where: "setup" may indicate that sensing measurement gaps are to be setup, and may further indicate one of the many gap patterns indicated by the sensmeasGapID field of the SensMeasConfig IE; and "release" may indicate existing sensing measurement gaps are to be released.

Alternatively, the IE MeasGapConfig may be used to specify the sensing measurement gap configuration and control the setup/release of sensing measurement gaps. For example, for a sensing gap length of 6 milliseconds (ms) and a sensing gap repetition period of 40 or 80 ms, the MeasGapConfig IE may be used without modification. To provide support for additional gap lengths/periods, the MeasGapConfig IE may be modified to include new Gap Pattern IDs that correspond to specific gap length/periods. Alternatively, the MeasGapConfig IE may be modified to include a parameter to explicitly specify the gap length, the gap period, or both.

In some scenarios or deployments, it may be desirable to configure a WTRU for sensing measurement gaps without requiring the WTRU to perform sensing during the gap. One such scenario is the case where sensing is only performed at the HeNB. In this scenario, the WTRUs may be configured for sensing measurement gaps, but may not be required to perform any sensing during the gap or report any sensing results. Another scenario may be the case where a WTRU does not support sensing functionality. In such a scenario, the WTRU may still be configured for sensing measurement gaps, because sensing may be performed by the HeNB and/or other WTRUs.

According to another embodiment, the SensMeasID IE may be used to identify a sensing measurement configuration, i.e., linking of a sensing measurement object ID, sensing reporting configuration ID, and a sensing measurement gap ID.

According to another embodiment, sensing measurement reporting may be achieved using the SensMeasResults IE, which may include fields to report sensing measurement results sensmeasResult and an associated sensmeasID. The field sensmeasID may identify the sensing measurement identity for which the reporting is being performed, and sensmeasResult may include the sensing results as defined in sensing reporting configurations.

According to an embodiment, detection may be based on signal classification. Methods may detect and characterize SU activity, including signal classification-based feature detection in the context of cellular technology. The spectrum to be sensed may be occupied by one PU, i.e., an incumbent of the spectrum as assigned by the regulator, or by any central entity owning the spectrum. It may also be occupied by one or more SUs trying to use the spectrum on a secondary basis in the absence of the PU.

Moreover, the devices using the spectrum (e.g. PUs or SUs) may be operating using one of many possible RATs or waveforms in general. For example, they may be WCDMA, LTE, Wi-Fi, Bluetooth, or Zigbee devices each with a different waveform. To sense the spectrum and detect either PUs and/or SUs, the sensing toolbox may be capable of identifying the presence of a subset of many possible waveforms expected to be present in the spectrum. This may be achieved by enabling the sensing toolbox to collect sample data using the RF front end, digitizing it, and performing either a waveform-based detection or a blind detection. The waveform-based detection may be performed, for example, on the digitized received samples with all possible waveform patterns stored in its memory, and maximum likelihood detection may be performed by correlating the received samples with each one of the stored waveforms to determine the waveform being used based on the highest correlation coefficient. Alternatively, the blind detection may be performed on the digitized received samples by extracting different statistical parameters (e.g., autocorrelation statistics, cyclo-stationarity) of the signal and comparing the statistical parameters of the digitized received samples with a predetermined set of statistical parameters for all possible waveforms and identifying the waveform with the best match of parameters.

Storing all possible waveform patterns or all possible statistical parameters of waveforms may impose high computation and/or storage complexity and high processing latency on the sensing toolbox, which may be of concern especially at the WTRU. These issues may be alleviated by signaling to the sensing toolbox the specific type of waveform to be detected or the specific statistical parameters to be extracted and thus reconfigure the sensing toolbox for the detection requirements of the spectrum. For example, the eNB may configure a WTRU to set its signal classification to detect a specific waveform pattern based on information collected by other WTRUs, by itself, or from the coexistence database. In the following figures, examples of receivers are shown including relevant components. Not all components of the receivers are shown, and components shown may or may not be included in the receiver.

Figure 7:
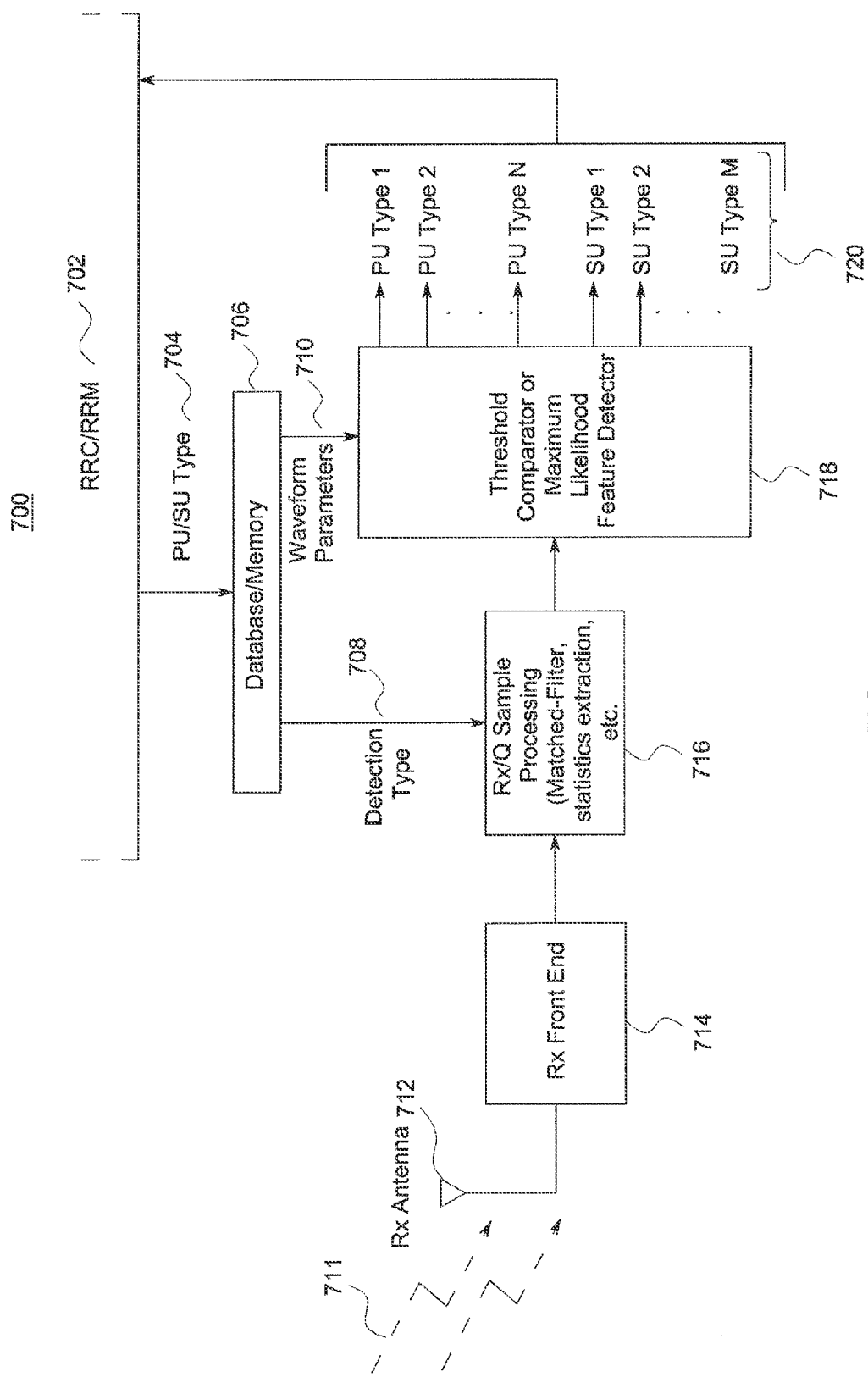
FIG. 7 shows an example sensing configuration system based on signal classification.

FIG. 7 shows an example sensing configuration system 700 based on signal classification. The receiver antenna 712 and front end 714 may receive and process sensing information and provide it to a receiver I/Q sample processor 716, which may also receive the detection type 708 from the database/memory 706. The output of the I/Q sample processor 716 may be sent to a decision entity called Threshold Comparator or Maximum Likelihood Feature Detector 718. The RRC/RRM entity 702 at the WTRU or eNB may provide a report of the PU/SU type 704 or interferer type to the database/memory 706. The database/memory 706 may store the waveform parameters 710 and proposed sensing algorithm/detection type 708 for all possible PUs, SUs or interferers that may be present on the channel. Based on the PU/SU type 704 or interferer type input from RRC/RRM 702 to the database/memory unit 706, the database/memory unit 706 may signal the detection type 708, which indicates the detection algorithm to be used, including but not limited to matched filter approach, statistical approach, and energy detection approach, to the I/Q Sample Processing 716 unit. The database/memory unit 706 may signal the waveform parameters 710, including but not limited to detection thresholds, to the Threshold comparator/Maximum Likelihood Feature detector 718. The output of the Threshold comparator/Maximum Likelihood Feature detector 718 may indicate PU type 720 (for example, DTV, Wireless Microphone, Radar, etc.) detected on the channel and/or SU type 720 (for example, LTE, Wi-Fi, Bluetooth, etc.) detected on the channel. This output 720 may be fed back to the RRC/RRM entity 702.

In the following, an example is described of Wi-Fi preamble-based feature detection for Wi-Fi as a SU. A wireless fidelity (Wi-Fi) signal waveform, which is based on the IEEE 802.11 standard, may have a packet structure which begins with a preamble. This preamble may consist of a short training field (STF), used for coarse frequency offset correction, coarse timing synchronization, automatic gain control (AGC) setting, and start of packet detection; and a long training field (LTF), used for fine frequency offset estimation, fine timing synchronization, and channel estimation. Since these fields may be a part of every packet, may have a pre-defined sequence, and may have good correlation properties (i.e., large separation between correlation peak and correlation side lobe), correlating the beginning of a packet with these sequences to detect the presence of the IEEE 802.11 based Wi-Fi waveform may provide a good indication of the presence or absence of a Wi-Fi signal operating as a SU in a white space spectrum.

Figure 8:
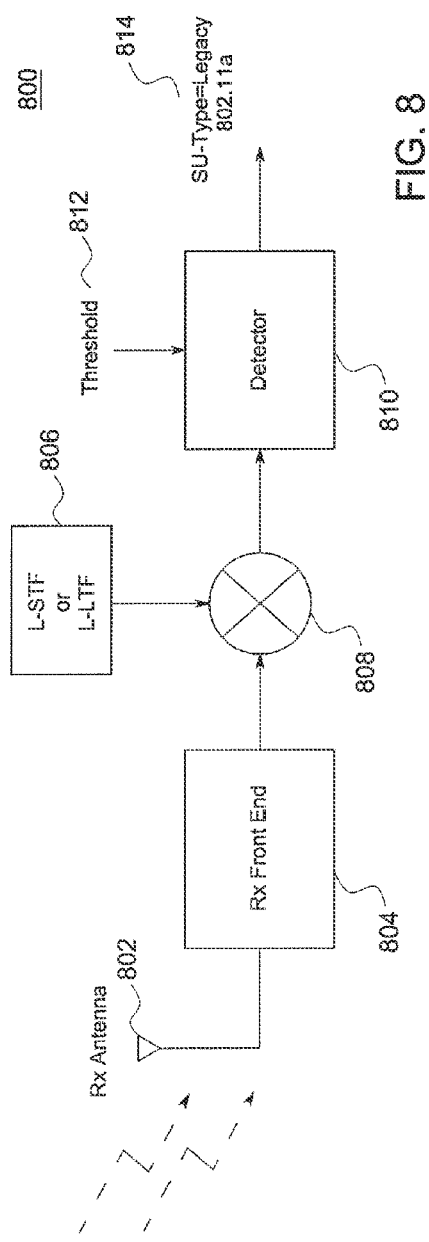
FIG. 8 shows an example of a receiver for Wi-Fi preamble based feature detection, which may be used for sensing a legacy 802.11a Wi-Fi signal operating as a SU.

FIG. 8 shows an example of a receiver 800 for Wi-Fi preamble based feature detection, which may be used for sensing a legacy 802.11a Wi-Fi signal operating as a SU. Not all components of the receiver 800 are shown, but rather only a subset. The receiver front end 804 may process the signal, received via the antenna 802, to produce received I/Q samples, which may be correlated 808 with either a L-STF or L-LTF sequence stored in memory 806, such that the resulting correlation peak values may be provided to a detector 810. The output 814 of the detector 810, which compares the correlation peak to a pre-defined threshold 812, may indicate if a legacy 802.11a waveform was detected.

Figure 9:
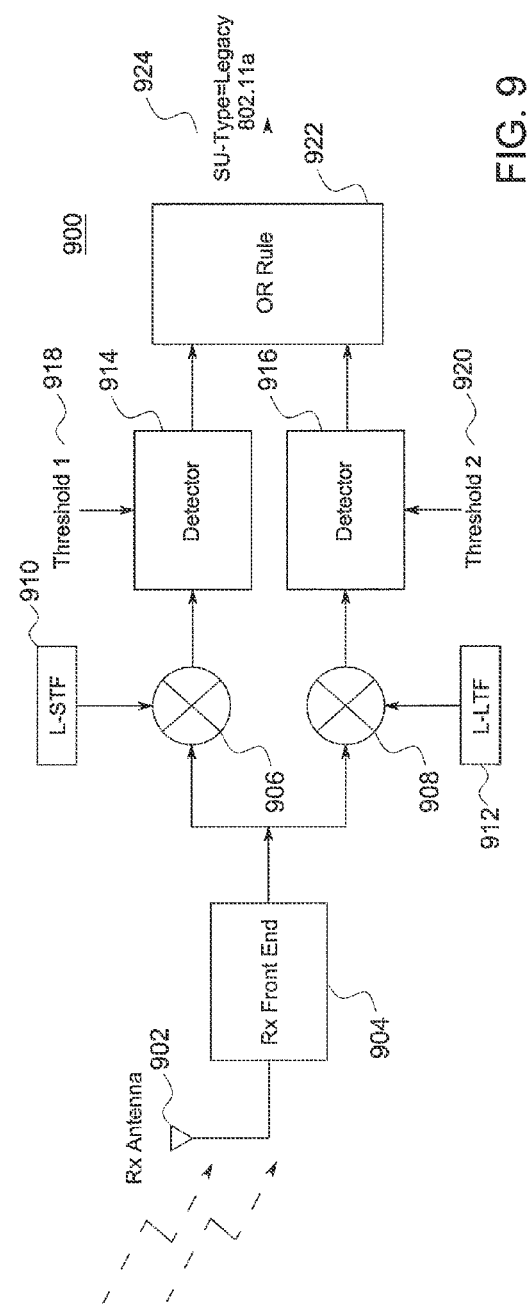
FIG. 9 shows another example of a receiver for Wi-Fi preamble based feature detection, which may be used for sensing a legacy 802.11a Wi-Fi signal operating as a SU.

FIG. 9 shows another example of a receiver 900 for Wi-Fi preamble based feature detection, which may be used for sensing a legacy 802.11a Wi-Fi signal operating as a SU. Not all components of the receiver 900 are shown, but rather only a subset. The receiver front end 904 may process the signal, received via the antenna 902, to produce received I/Q samples, which may be correlated 906 and 908 with the a L-STF and L-LTF sequences, both of which may be stored in local memory 910 and 912, respectively. The resulting correlation peak values may be provided to corresponding detectors 914 and 916. The outputs of the detectors 914 and 916, which compare the correlation peaks to pre-defined thresholds 918 and 920, respectively, may indicate if a legacy 802.11a waveform was detected or not as a single bit binary output. The OR rule unit 922 may perform a logical "OR" operation on the outputs of the detectors 914 and 916, producing a logical '1' if at least one of the outputs of the detectors is a logical '1', and producing a logical '0' otherwise.

Figure 10:
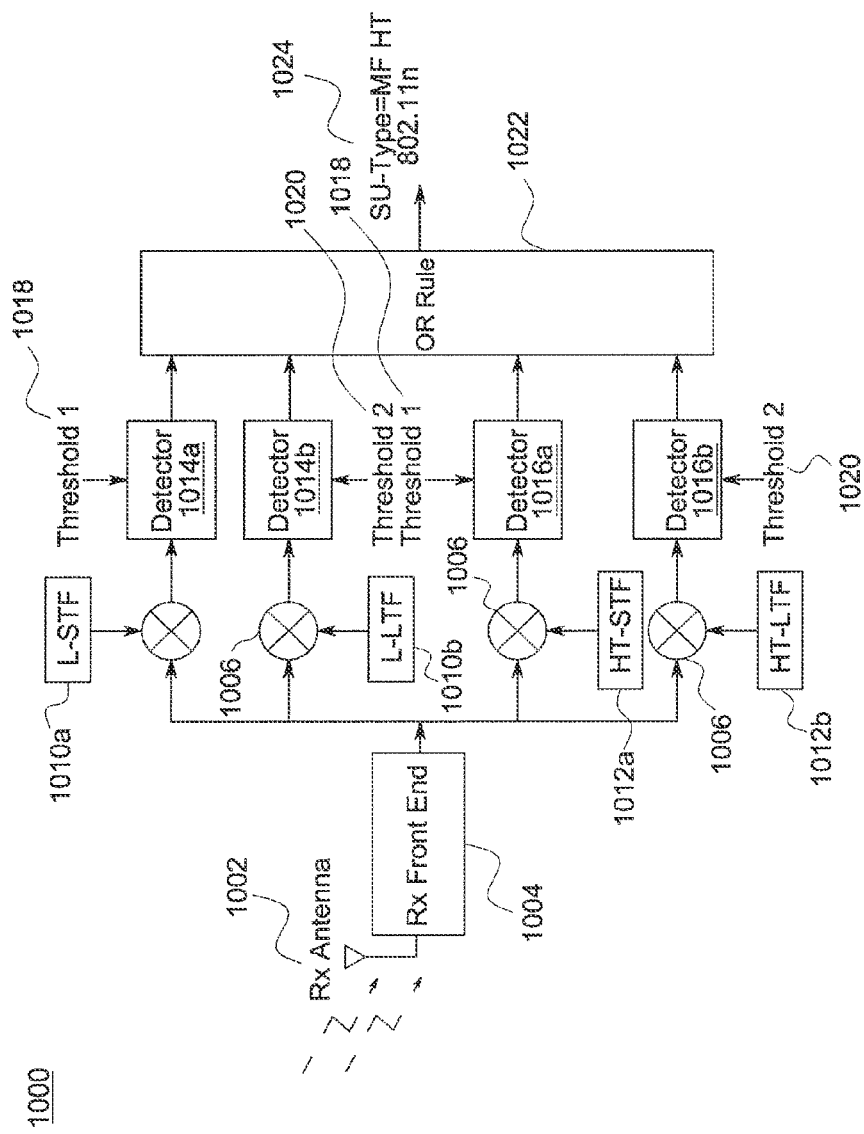
FIG. 10 shows an example of a receiver for Wi-Fi preamble based feature detection, which may be used for sensing a Mixed Format (MF) High Throughput (HT) 802.11n Wi-Fi signal operating as a SU.

FIG. 10 shows an example of a receiver 1000 for Wi-Fi preamble based feature detection, which may be used for sensing a Mixed Format (MF) High Throughput (HT) 802.11n Wi-Fi signal operating as a SU. The receiver front end 1004 may process the signal, received via the antenna 1002, to produce received I/Q samples, which may be correlated 1006 with the L-STF, L-LTF, HT-STF, and HT-LTF sequences, which may be stored in local memories 1010a,b and 1012a,b, respectively. The resulting correlation peak values may be provided to corresponding detectors 1014a,b and 1016a,b. The outputs of the detectors 1014a,b and 1016a,b, which compare the correlation peaks to pre-defined thresholds 1018 and 1020, may indicate if a Mixed Format (MF) High Throughput (HT) 802.11n waveform was detected or not as a single bit binary output. The OR rule unit 1022 may perform a logical "OR" operation on the outputs of the detectors 1014a,b and 1016a,b, producing a logical '1' if at least one of the outputs of the detectors 1014a,b and 1016a,b is a logical '1', and producing a logical '0' otherwise.

FIG. 11 shows an example of a receiver 1100 for Wi-Fi preamble based feature detection, for sensing a Greenfield (GF) High Throughput (HT) 802.11n Wi-Fi signal operating as a SU. The receiver front end 1104 may process the signal, received via the antenna 1102, to produce received I/Q samples, which may be correlated 1108 with either GF-HT-STF or GF-HT-LTF sequences stored in memory 1106, such that the resulting correlation peak values may be provided to a detector 1110. The output 1114 of the detector 1110, which compares the correlation peak to a pre-defined threshold 1112, may indicate if a Greenfield (GF) High Throughput (HT) 802.11n waveform was detected.

FIG. 12 shows an example of a receiver 1200 for Wi-Fi preamble based feature detection, for sensing a Greenfield (GF) High Throughput (HT) 802.11n Wi-Fi signal operating as a SU. The receiver front end 1204 may process the signal, received via the antenna 1202, to produce received I/Q samples, which may be correlated 1206 and 1208 with the a GF-HT-STF and GF-HT-LTF sequences, both of which may be stored in local memory 1210 and 1212, respectively. The resulting correlation peak values may be provided to corresponding detectors 1214 and 1216. The outputs of the detectors 1214 and 1216, which compare the correlation peaks to pre-defined thresholds 1218 and 1220, respectively, may indicate if a Greenfield (GF) High Throughput (HT) 802.11n waveform was detected or not as a single bit binary output. The OR rule unit 1222 may perform a logical "OR" operation on the outputs of the detectors 1214 and 1216, producing a logical '1' if at least one of the outputs of the detectors is a logical '1', and producing a logical '0' otherwise.

Sensing measurement gaps may be synchronized across neighbor cells to solve the issue of possible unsynchronized gap patterns across neighbor supplementary cells using the same LE channel.

According to an embodiment, a gap pattern may be autonomously detected on a neighbor SuppCell. Each WTRU in the serving cell may make neighbor cell measurements, like RSSI and RSRP, and may report back to the eNB periodically or on an event-triggered basis. The neighbor cell measurements may include measurements on primary, secondary, and supplementary cells. In the case when the serving cell and a neighbor cell operate on the same LE channel but each of them uses a different and unsynchronized sensing measurement gap pattern, the neighbor cell measurement (for example, RSRQ) may look like the examples of neighbor cell measurements shown in FIGS. 13A-13D.

FIGS. 13A-13D illustrate different examples of neighbor cell measurement/gap patterns 1300A-1300D, respectively, where transmission on the SuppCell is in the downlink direction for both the serving eNB and the neighbor eNB, and the WTRU is in the receive mode so that it may receive signals from its serving eNB and also make measurements on the neighbor eNB. These examples show some possibilities of unsynchronized gap patterns on neighbor eNB SuppCells operating on the same channel and how the time stamps and time durations may be measured in each case.

Figure 13A:
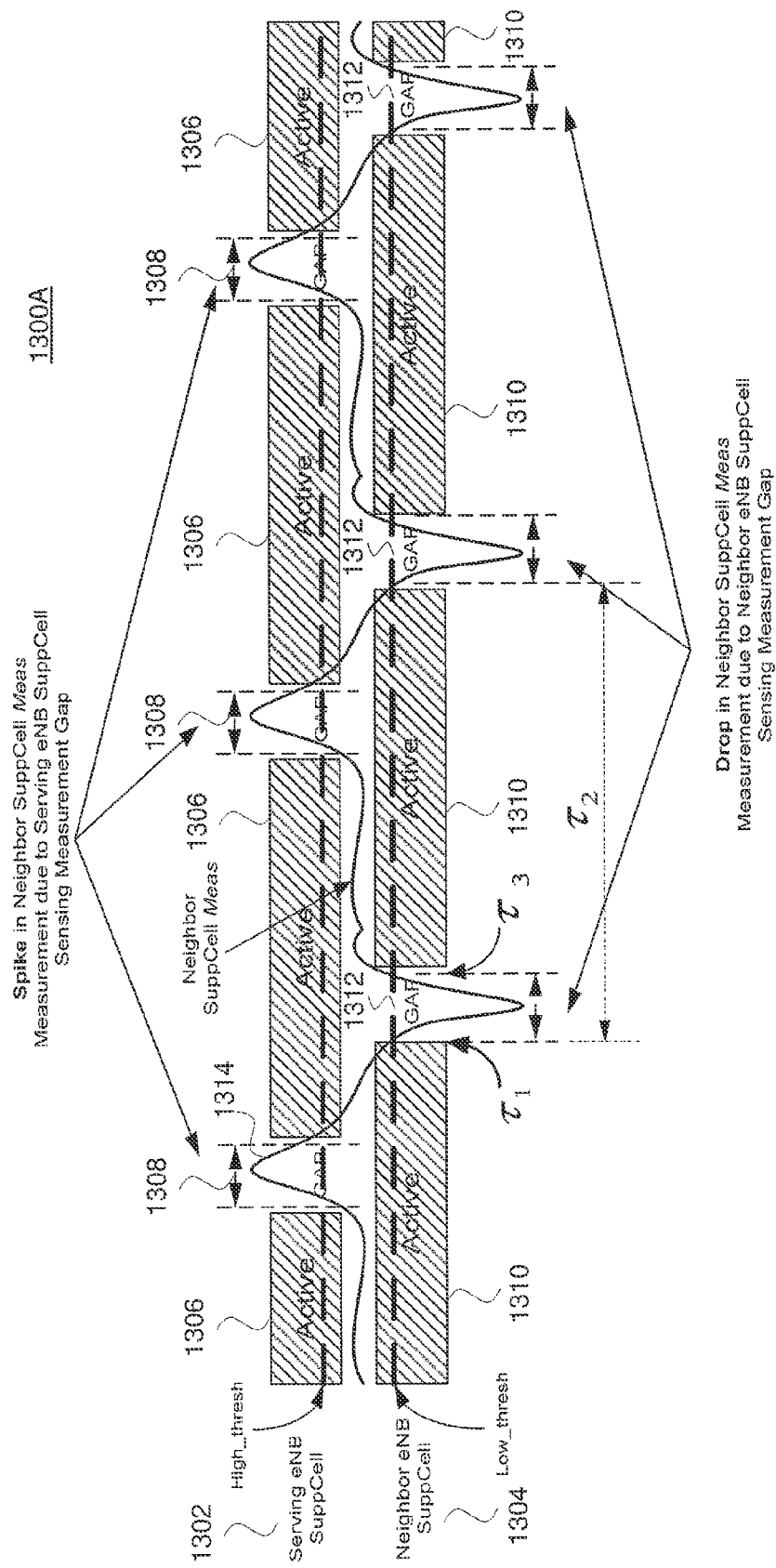
FIGS. 13A-13D illustrate different examples of neighbor cell measurement/gap patterns where transmission on the supplementary cell (SuppCell) is in the downlink direction for both the serving eNB and the neighbor eNB, and the WTRU is in the receive mode.
Figure 13B:
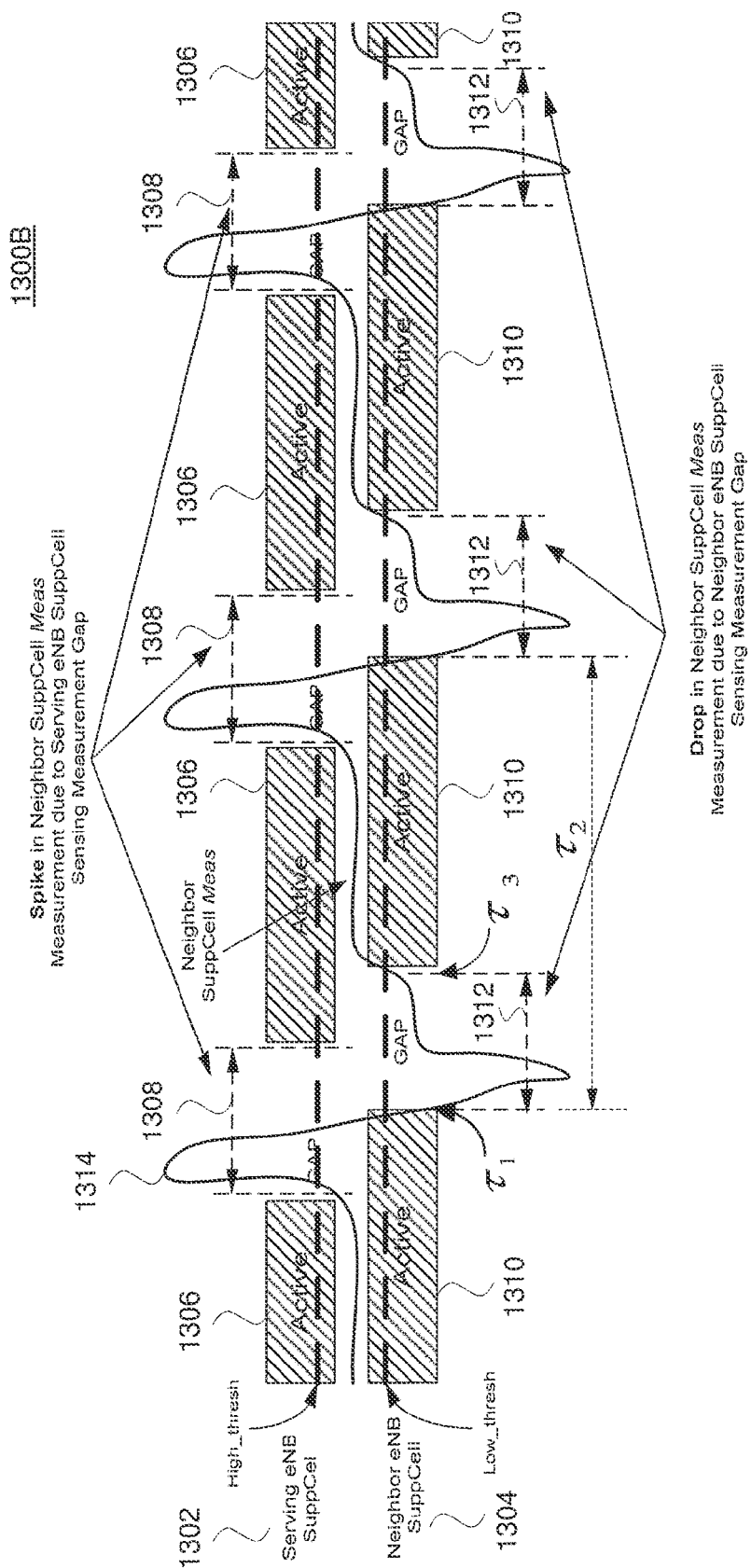
Figure 13C:
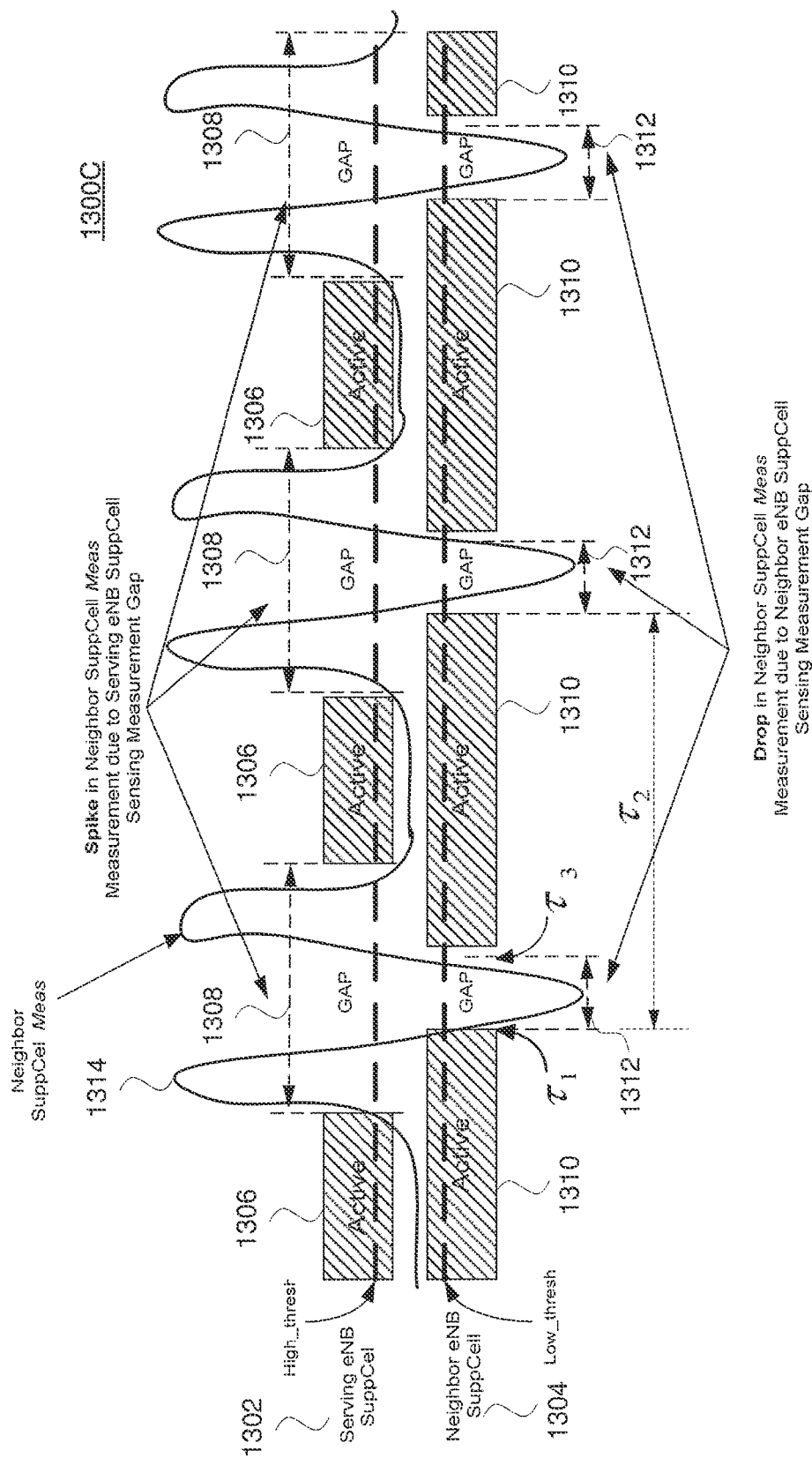
Figure 13D:
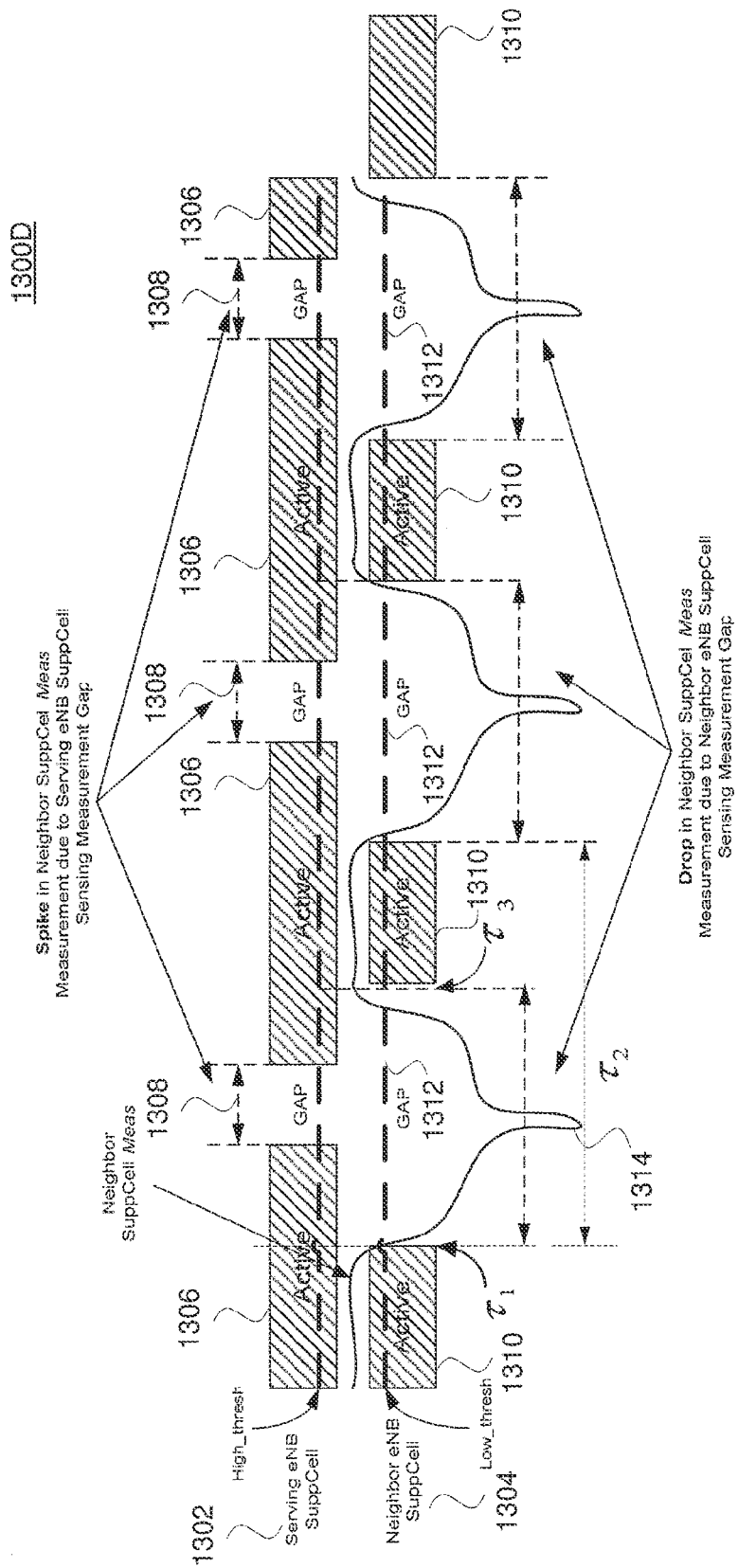

According to FIGS. 13A-13D, the serving eNB may actively send transmissions 1306 on the serving eNB SuppCell 1302 with intermittent sensing measurement gaps 1308. The WTRU may perform active neighbor SuppCell measurement 1314 during active periods 1310 on the neighbor eNB SuppCell 1304 with intermittent sensing measurement gaps 1312. FIG. 13A shows an example scenario where neighbor eNB SuppCell measurement 1314 is for non-overlapping measurement gaps 1308 and 1312 on serving eNB SuppCell 1302 and neighbor eNB SuppCell 1304. FIG. 13B shows an example scenario where neighbor eNB SuppCell measurement 1314 is for partially overlapping measurement gaps 1308 and 1312 on serving eNB SuppCell 1302 and neighbor eNB SuppCell 1304. FIG. 13C shows an example scenario where neighbor eNB SuppCell measurement 1314 is for completely overlapping measurement gaps 1308 and 1312 on serving eNB SuppCell 1302 and neighbor eNB SuppCell 1304, where here the serving cell measurement gaps 1308 are larger than the neighbor cell measurement gaps 1312. FIG. 13D shows an example scenario where neighbor eNB SuppCell measurement 1314 is for completely overlapping measurement gaps 1308 and 1312 on serving eNB SuppCell 1302 and neighbor eNB SuppCell 1304, where here the serving cell measurement gaps 1308 are smaller than the neighbor cell measurement gaps 1312.

As illustrated in FIGS. 13A-13D, a spike in the neighbor SuppCell (RSRQ) measurement 1314 may occur due to a sensing measurement gap 1308 on the serving eNB SuppCell 1304. This effect may be due to the total noise floor being reduced due to lack of self-interference from the serving eNB SuppCell 1304 transmission. Similarly, a drop in the neighbor SuppCell RSRQ measurement 1314 may occur due to a sensing measurement gap 1312 on the neighbor eNB SuppCell 1304. This effect may be due to the total noise floor being reduced due to lack of energy from the neighbor eNB SuppCell 1304 due to the sensing measurement gap 1312.

Thus, by knowing the sensing measurement gap 1308 of the serving eNB SuppCell 1302 beforehand, the WTRU may identify the drops in the measurement 1314 as sensing measurement gaps 1312 from the neighbor cell. According to an embodiment, two threshold values may be defined: high_thresh and low_thresh. The Neighbor SuppCell Meas measurement 1314 may compared against the high_thresh to determine a spike in the measurement 1314 and against the low_thresh to determine a drop in the measurement 1314. These thresholds may be signaled by the eNB to the WTRUs or may be pre-stored inside the WTRU, for example.

Based on the neighbor SuppCell measurement 1314, the WTRU may report any of the following information back to the eNB on the uplink: Gap Pattern, which may indicate Periodic or Aperiodic; Event E1a "Neighbor SuppCell Gap Start", which may indicate that the measurement 1314 falls below low_thresh; $\tau_1$, which may be a time stamp with respect to the SFN corresponding to even E1a; $\tau_2$, which may indicate the time duration between consecutive E1a events; event E1b "Neighbor SuppCell Gap End", which may indicate that the measurement 1314 goes above low_thresh; $\tau_3$, which may be a time stamp with respect to the SFN immediately following $\tau_1$ corresponding to event E1b; and Percent Utilization, which may be the percentage of LE channel usage by a neighbor eNB in case of an aperiodic gap pattern.

The eNB may use any of the above information to reconfigure the sensing measurement gap 1308 schedule in the serving eNB SuppCell 1302 in a subsequent dedicated or broadcast control signaling to the WTRUs and thus synchronize with the neighbor SuppCell gap 1312 pattern.

Figure 14:
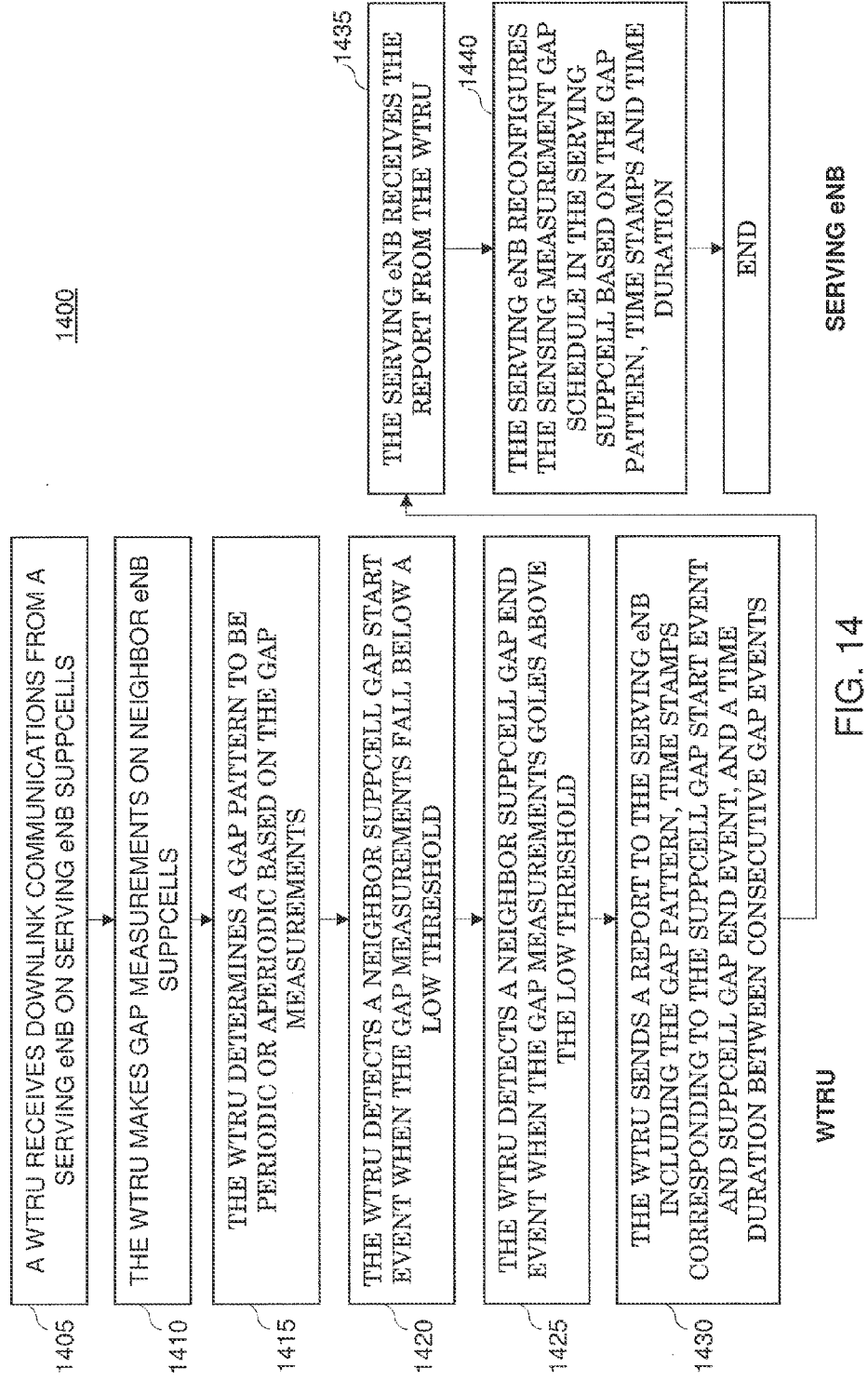
FIG. 14 shows an example flow diagram of a method for synchronizing serving and neighboring SuppCell gap patterns.

FIG. 14 shows an example flow diagram of a method 1400 for synchronizing serving and neighboring SuppCell gap patterns. A WTRU may receive downlink communications from a serving eNB on serving eNB SuppCells, 1405. The WTRU may make gap measurements on neighbor eNB SuppCells, 1410. The WTRU may determine a gap pattern of the serving and neighbor SuppCells to be periodic or aperiod based on the gap measurements, 1415. The WTRu may detect a neighbor SuppCell gap start event when the gap measurements fall below a low threshold, 1420. The WTRU may detect a neighbor SuppCell gap end event when the gap measurements go above the low threshold, 1425. The WTRU may send a report to the serving eNB including the gap pattern, timestamps corresponding to the SuppCell gap start and end events, and a time duration between consecutive gap events, 1430. The report may include other reporting values, such as a percent utilization of the LE channel by the neighbor eNB.

The serving eNB may receive the report for the WTRU, 1435. The serving eNB may reconfigure the sending measurement in the serving SuppCell based on the report, including the gap pattern, time stamps and duration, 1440.

Figure 15:
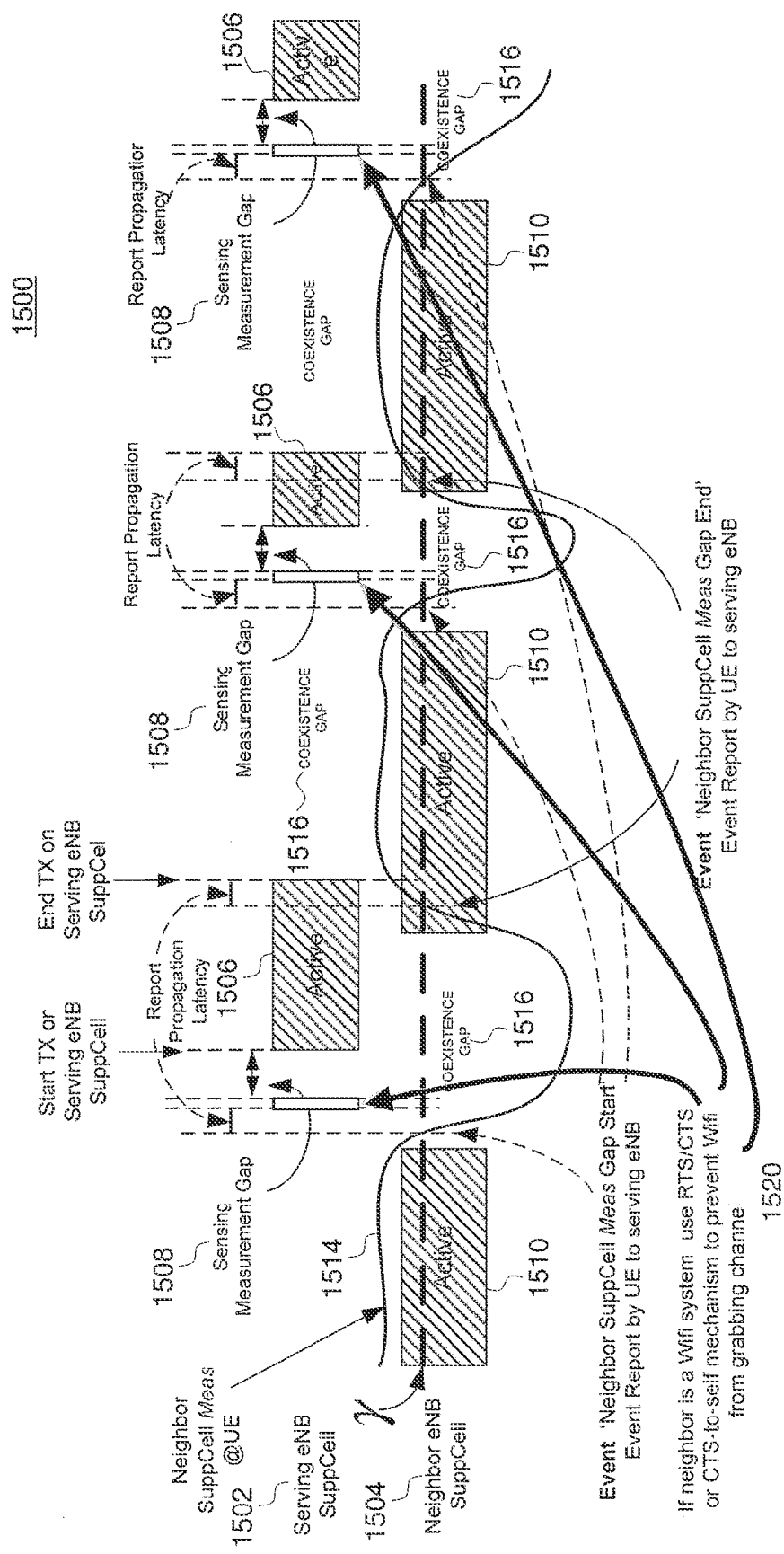
FIG. 15 illustrates an example of neighbor cell measurement/gap schedules on the serving SuppCell and the neighbor SuppCell and the impact on neighbor SuppCell measurement.

FIG. 15 illustrates an example of neighbor cell measurement/gap schedules 1500 on the serving SuppCell 1502 and the neighbor SuppCell 1504 and the impact on neighbor SuppCell measurement 1514.

The above method of making the neighbor SuppCell measurement 1514 may also be used for co-existence with neighbor eNBs using the same LE channel as a SuppCell.

The WTRUs in the serving cell may make neighbor SuppCell measurements 1514, for example, RSRQ or Scaled_Neighbor_SuppCell_Meas, to determine usage characteristics of the neighbor eNB SuppCell 1504. The WTRUs may report an event to the serving eNB that the neighbor SuppCell Measurement 1514 may fall below a certain pre-defined threshold γ. Based on this event, the serving eNB may assume that the neighbor eNB SuppCell 1504 is in a coexistence gap 1516 and may schedule a sensing measurement gap 1508 first and then resume actively transmitting data 1506 on the serving SuppCell 1502.

When the neighbor SuppCell Measurement 1514 exceeds the pre-defined threshold γ, the serving eNB may stop active transmission 1506 on the serving SuppCell 1502 and allows the neighbor SuppCell 1504 to actively use the channel 1510. Since the serving SuppCell 1502 relinquishes the LE channel in reaction to the presence of the neighbor SuppCell transmission 1510, this may be viewed as a "reactive coexistence" mechanism.

This kind of an instantaneous gap event detection and immediate reporting on the uplink followed by sensing measurement gap scheduling and then data transmission may occur in an FDD system. In a TDD system, an uplink frame may occur later in time, and thus adapting to neighbor SuppCell gaps may or may not happen instantaneously.

With reference to FIG. 15, if the neighbor cell being monitored is a Wi-Fi system, the serving eNB may transmit a clear to send (CTS)-to-self (or transmit a ready to send (RTS) and wait for the CTS from the WRTU) 1520 to silence the neighbor Wi-Fi system for the duration of the network allocation vector (NAV). The serving eNB may then schedule a sensing operation for PU detection and then transmit for the rest of the NAV duration after the sensing measurement time. The RTS, CTS, and/or CTS-self packet format may be enhanced to signal the occurrence of a sensing measurement gap immediately.

According to another embodiment, a Neighbor SuppCell Measurement Metric may be used. A measurement like RSRQ may swing up and down even with WTRU mobility from cell-center to cell-edge or vice versa. Even time selectivity of the channel as seen by a stationary WTRU may also bring about swings in such measurements. Thus, a measurement metric may be chosen such that swings in measurement more accurately indicate the presence of sensing measurement gaps and not, for example, changes due to received power due to WTRU mobility. Example, the following metric may be used:

Unbiased_Neighbor_SuppCell_Meas=Neighbor_
   SuppCell_Meas−Δ          Equation 1 where

Δ=Current_Neighbor_PCell_Meas−Past_Neighbor_P-
   Cell_Meas                Equation 2 or

Δ=Current_Neighbor_SCell_Meas−Past_Neighbor_S-
   Cell_Meas                Equation 3 and the time value $\tau_i$ of the drops and spikes in Neighbor_SuppCell_Meas measurement may be defined as:

$\tau_i = \{\tau: \text{Unbiased\_Neighbor\_SuppCell\_Meas}(\tau) < \text{low\_thresh}\}$          Equation 4 where "Meas" may be a measurement of the neighbor cell, for example, RSRQ.

Neighbor_SuppCell_Meas may be the measurement on the neighbor SuppCell. The averaging window size and time constant in the case of an exponential filter may be chosen appropriately such that the gap may be detected without much latency. Current_Neighbor_PCell_Meas may be the average measurement on the neighbor primary/anchor cell at the current instant. Past_Neighbor_PCell_Meas may be the average measurement on the neighbor primary/anchor cell "t" milliseconds in the past. Current_Neighbor_SCell_Meas may be the average measurement on the neighbor secondary cell at the current instant. Past_Neighbor_SCell_Meas may be the average measurement on the neighbor secondary cell "t" milliseconds in the past.

Alternatively, the time value $\tau_i$ of the drops and spikes in Neighbor_SuppCell_Meas measurement may be identified by tracking the rate of change of the metric and comparing it against another pre-defined threshold, δ, as follows:

$$\tau_i = \left\{\tau: \left.\frac{d(\text{Neighbor\_SuppCell\_Meas})}{dt}\right|_{t=\tau} > \delta \right\}$$          Equation 5

A threshold, for example, a high threshold "high_thresh" and low threshold "low_thresh," or δ may be defined to detect a spike and a drop in measurement respectively.

The estimated neighbor SuppCell gap pattern may be sensing measurement gaps or coexistence gaps scheduled on the neighbor SuppCell. The serving eNB may use this information on the neighbor SuppCell gap pattern to synchronize the serving SuppCell sensing measurement gap pattern with that of the neighbor cell for better PU detection at low SNRs, or to coexist with the neighbor SuppCell transmission in a TDM fashion and share the LE channel in a fair manner.

If there are multiple neighbor eNBs using the same LE channel as a SuppCell, and each of them uses a different gap schedule, and all of them are completely unsynchronized with each other, the serving eNB may consider using a union or an intersection of all the gap patterns of the neighbor SuppCells.

Another example embodiment to facilitate reliable PU detection may use natural gaps instead of or in addition to gap pattern synchronization. This solution may exploit the bursty nature of transmissions from neighboring networks to identify "natural gaps"; i.e., periods where the gaps of a given network overlap with periods of inactivity in the other networks. How often a natural gap occurs is a function of the network loads and the gap periods/durations. A given network may configure gaps to facilitate PU detection and/or other sensing or measurements, or to allow for coexistence with other SUs or networks. During such periods, the results of the PU detection may be relied upon with a high degree of confidence. The decision to evacuate a channel may therefore be a function of the results of the PU detection and a confidence factor; i.e., whether the PU detection was performed during a natural gap.

According to an example embodiment, a decision to vacate the channel may be made whenever a PU is detected or the PU detection may not be performed with a high degree of confidence; i.e., it was not performed during a natural gap. Table 6 shows an example Evacuation Decision Truth Table in accordance with this embodiment.

TABLE 6

| PU Detection | Confidence Factor | Evacuation Decision |
|---|---|---|
| No | Low | Yes |
| No | High | No |
| Yes | Low | Yes |
| Yes | High | Yes |

Figure 16:
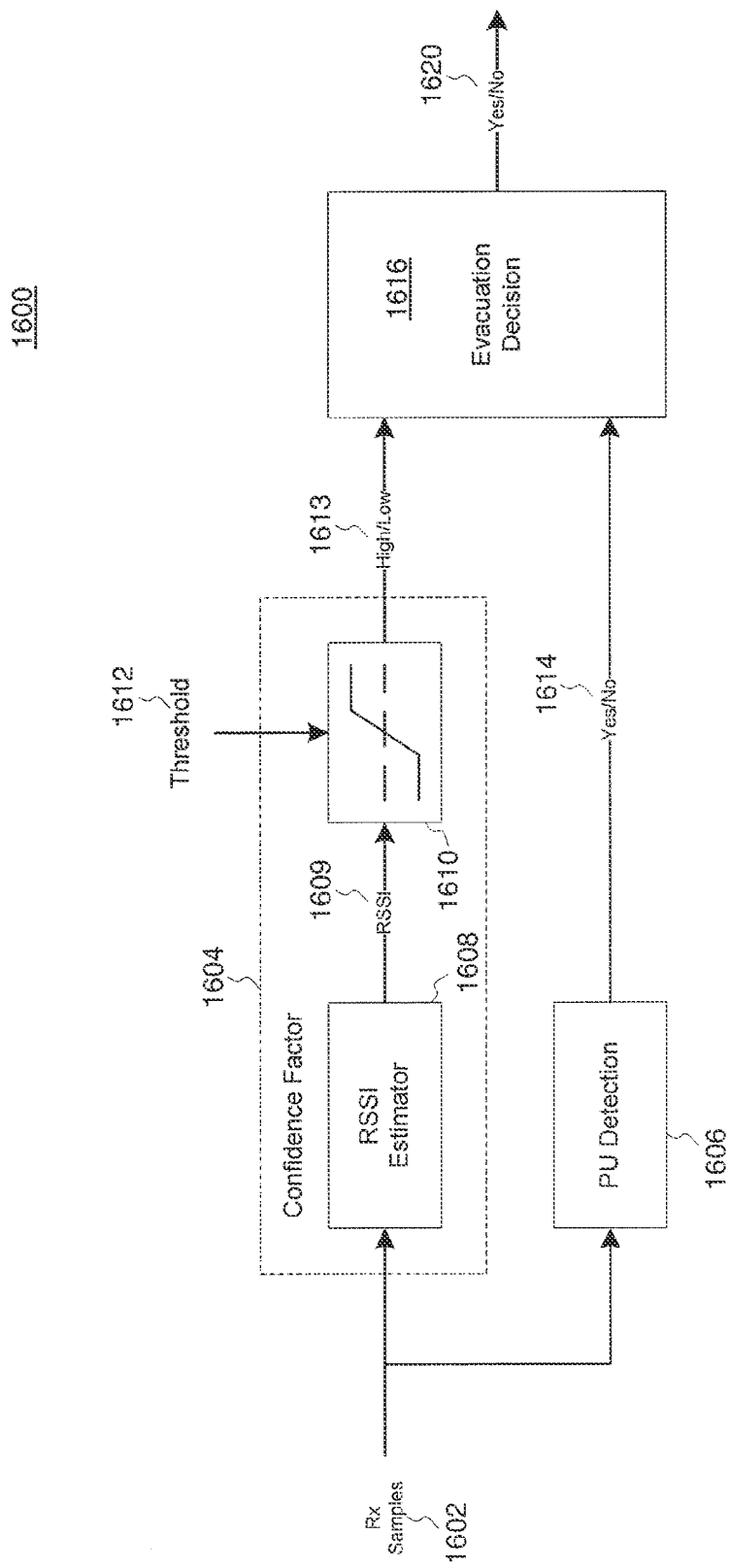
FIG. 16 shows a high level block diagram of an example system for making a channel evacuation decisions.

FIG. 16 shows a high level block diagram of an example system 1600 for making a channel evacuation decisions 1620. A metric such as RSSI 1609 may be used to determine the confidence factor. The received samples 1602 may be provided to a confident factor determination unit 1604, comprising an RSSI estimator 1608 to generate an RSSI measurement based on the received samples 1602, and a confidence factor estimator 1610, which may determine that RSSI measurements 1609 below a given threshold 1612 may result in a high confidence factor 1613, while RSSI measurements 1609 above the threshold 1612 may result in a low confidence factor 1613. Received samples 1602 that correspond to the period over which PU detection was performed may be used to compute the RSSI 1609 and determine the confidence factor 1613. The results 1614 of the PU detection 1606 in combination with the confidence factor 1613 may then be used by the evacuation decision unit 1616 to make the evacuation decision 1620.

Figure 17:
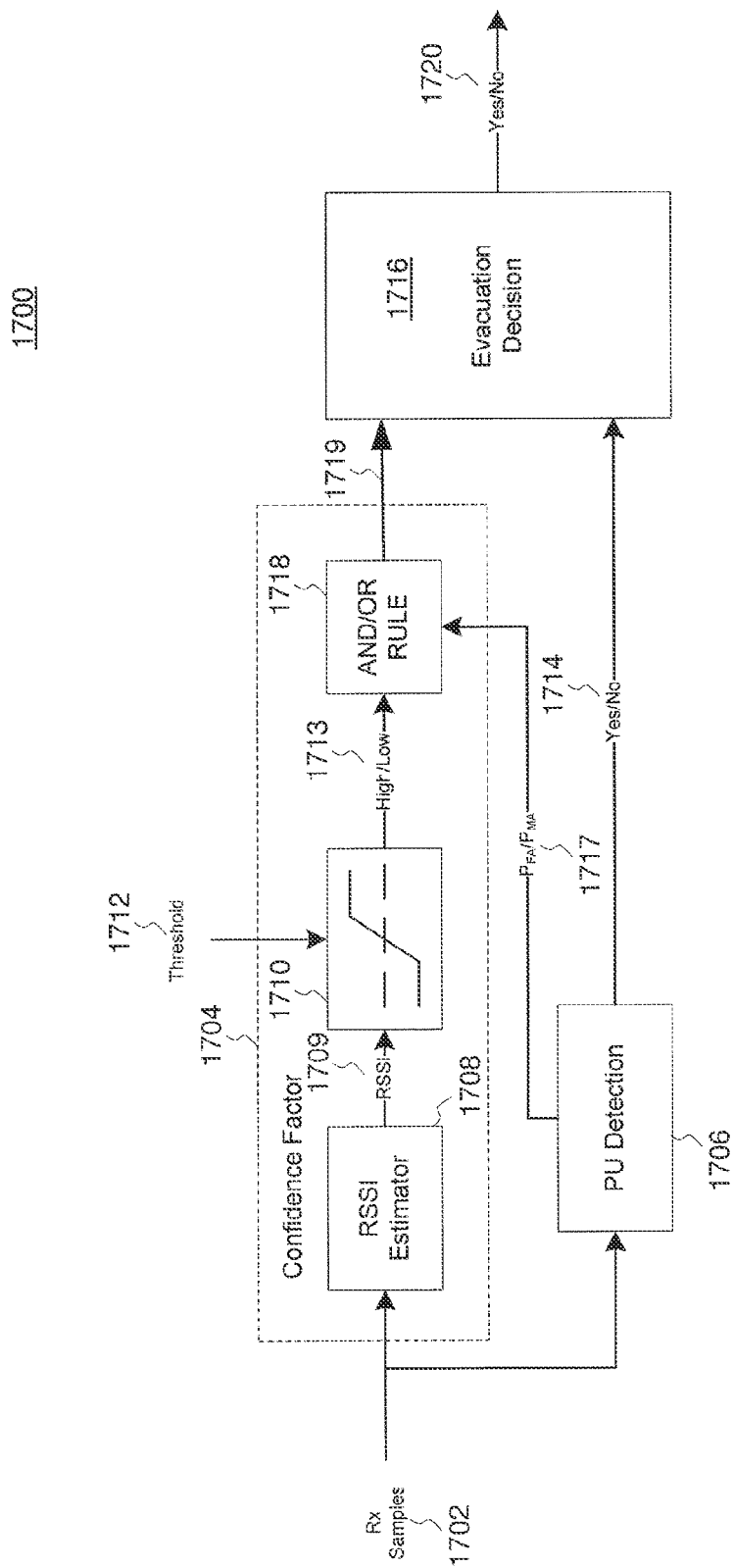
FIG. 17 shows a high level block diagram of another example system for making a channel evacuation decisions.

FIG. 17 shows a high level block diagram of another example system 1700 for making a channel evacuation decisions 1720. The PU detection unit 1706 may detect PU based on the received samples 1702. The confidence factor determination unit 1704 may generate a confidence factor 1713 using the RSSI estimator 1708 and confidence factor estimator 1710 based on the received samples, as described in FIG. 16. However, in the embodiment of FIG. 17, metrics such as Probability of False Alarm (PFA) and/or Probability of Missed Detection (PMD) may also be generated by the PU detection unit 1706 and considered by the confidence factor determination unito 1704 in determining a confidence factor 1719. Correlation with a feature-based PN sequence or cyclostationarity pattern matching may be used to determine the PFA and PMD metrics in the PU detection unit 1706, for example. Such metrics may be used in addition to or instead of the RSSI based confidence factor 1713 using an and/or rule unit 1718, to determine the confidence factor 1719. The confidence fact 1719 may then be used by the evacuation decision unit 1716 to make the evacuation decision 1720.

To reduce the likelihood of unnecessary evacuation of the channel, the systems in FIGS. 16 and 17 may make a number X (or more positive) evacuation decisions over a given decision period of time, TDecision, for example, before triggering the channel evacuation. The parameters X and TDecision may be chosen such that the in-service monitoring requirements defined for PU detection may still be met.

According to an embodiment, the evacuation decisions may be made at the WTRU. In this case, the resulting decision (Yes/No) may be signaled to the base station. Alternatively, the PU detection result and the confidence factor may be signaled to the base station, thereby allowing the evacuation decisions to be made at the base station. In an example, the evacuation decision algorithm at the base station may combine the results from multiple WTRUs to determine whether a channel should be evacuated.

If the system operates on a "PU-Assigned" channel, and if the sensing toolbox at the eNB and/or the WTRU detects one or more SU systems operating in the channel, the eNB may evacuate the "PU-Assigned" channel immediately due to the risk of not detecting a PU.

According to an embodiment, the coordination of sensing measurement configuration exchange between neighbor eNBs may be done in a centralized approach. The purpose of requesting/exchanging sensing measurement configuration information between eNBs may be any of the following reasons: network-controlled synchronization of sensing measurement gaps between adjacent cells; initiating proactive filtering of sensing measurements of the target eNB supplementary CC; or coexistence of neighbor SuppCells by enabling TDM access to a common LE channel.

To support WTRU mobility and seamless handover of WTRUs between adjacent/neighbor eNBs, the eNB may need to be aware of the channels (licensed and license-exempt) configured and/or assigned by the other eNBs in its neighborhood. The eNB may initiate channel sensing on those channels and at specific WTRUs impacted by the handover. The WTRUs in turn may report measurements periodically back to the eNB. Based on the sensing measurement reports, the eNB may make the handover decision.

To support the above procedure, the serving eNB may acquire two sets of information from the target eNB: neighbor SuppCell object ID (SensMeasObj_ID) and neighbor SuppCell sensing measurement configuration ID (Sens-Meas_ID). This information may be acquired by the eNB, for example, in one of the following ways: over the X2 interface prior to handover, illustrated by example in FIG. 18; or over the S1 interface prior to handover illustrated by example in FIG. 19.

Figure 18:
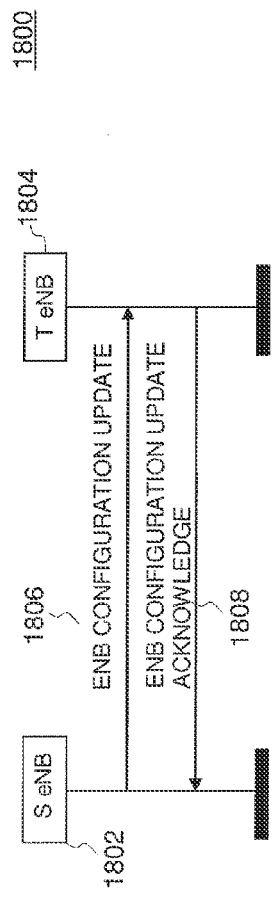
FIG. 18 shows a call flow diagram of an example method for sensing measurement configuration exchange over the X2 interface.

FIG. 18 shows a call flow diagram of an example method 1800 for sensing measurement configuration exchange over the X2 interface. The serving eNB 1802 may request the target eNB 1804 for the two sets of sensing measurement configuration information on the SuppCell using the "ENB_CONFIGURATION_UPDATE" X2AP message 1806. The target eNB 1804 may respond with the sensing measurement configuration information using the "ENB_CONFIGURATION_UPDATE_ACKNOWL-EDGE" X2AP message 1808.

Figure 19:
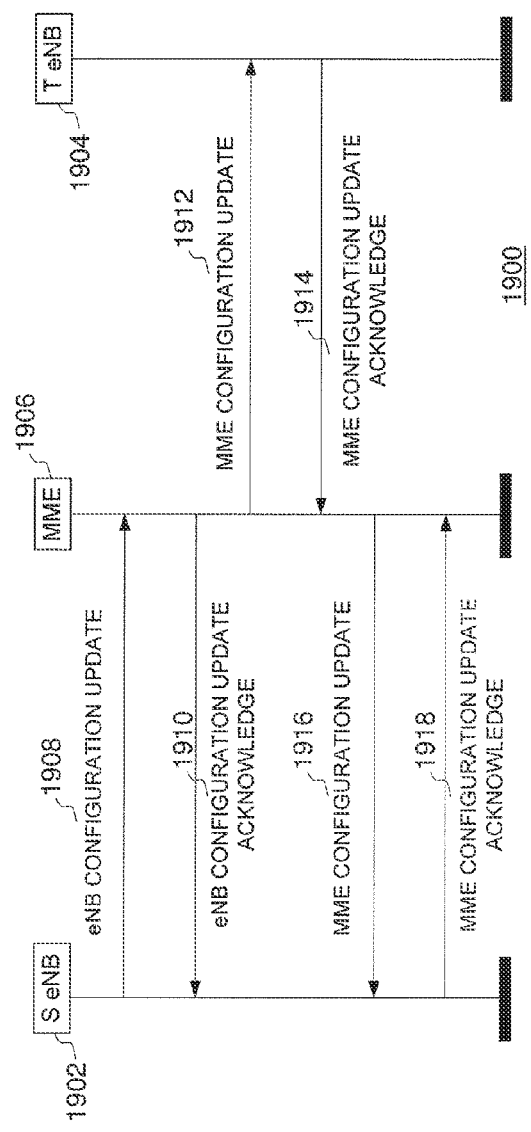
FIG. 19 shows a call flow diagram of an example method for sensing measurement configuration exchange over the S1 interface.

FIG. 19 shows a call flow diagram of an example method 1900 for sensing measurement configuration exchange over the S1 interface. The serving eNB 1902 may request from the MME 1906 for the target eNB's 1904 sensing measurement configuration information on the SuppCell using the "ENB_CONFIGURATION_UPDATE" S1AP message 1908. The MME 1906 may acknowledge the receipt of the ENB_CONFIGURATION_UPDATE message 1908 to serving eNB 1902 using the "ENB_CONFIGURATION_UP-DATE_ACKNOWLEDGE" S1AP message 1910.

The MME 1906 may forward the request to the target eNB 1904 using the "MME_CONFIGURATION_UP-DATE" S1AP message 1912. The target eNB 1904 may respond to the MME 1906 with the sensing measurement configuration information on its Supp Cell using the "MME_CONFIGURATION_UPDATE_ACKNOWL-EDGE" S1AP message 1914. The MME 1906 may forward the information to the serving eNB 1902 using the "MME_CONFIGURATION_UPDATE" S1AP message 1916, which the serving eNB 1902 may acknowledge using the "MME_CONFIGURATION_UPDATE_ACKNOWL-EDGE" S1AP message 1918.

In the above cases, the information about the sensing measurement configuration on the SuppCell configured by the target eNB may be communicated to the WTRU by the serving eNB using dedicated signaling, for example, RRC-ConnectionReconfiguration message or MAC control elements.

According to another embodiment, sensing may be done in a proactive approach, and sensing result may be reported to the target eNB. Using the information about sensing measurement configuration on the SuppCell configured the target eNB, the WTRU may proactively start sensing the target eNB's supplementary channel during measurement gaps scheduled by the target eNB. Once reliable/converged sensing results are available, the WTRU may signal the sensing results proactively to the target eNB, which may be done, for example, in one of the following ways.

Figure 20:
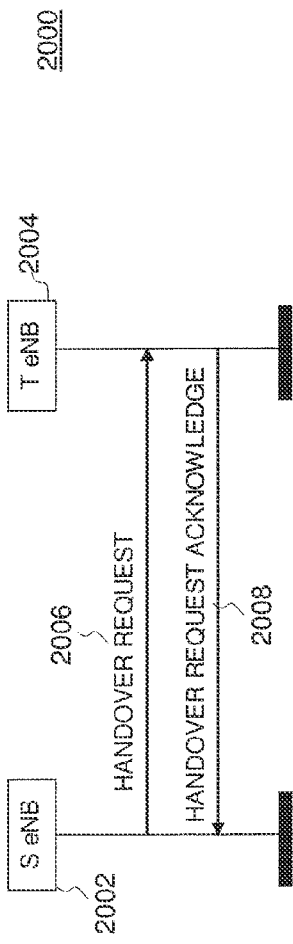
FIG. 20 shows a call flow diagram of an example method for exchanging sensing results over the X2 interface.

The WTRU may send the target eNB's sensing measurement results to the source (serving) eNB. FIG. 20 shows a call flow diagram of an example method 2000 for exchanging sensing results over the X2 interface. The serving eNB 2002 may forward the results to the target eNB 2004 using the "HANDOVER_REQUEST" X2AP message 2006. The target eNB may acknowledge the receipt using the "HAN-DOVER_REQUEST_ACKNOWLEDGE" X2AP message 2008.

Figure 21:
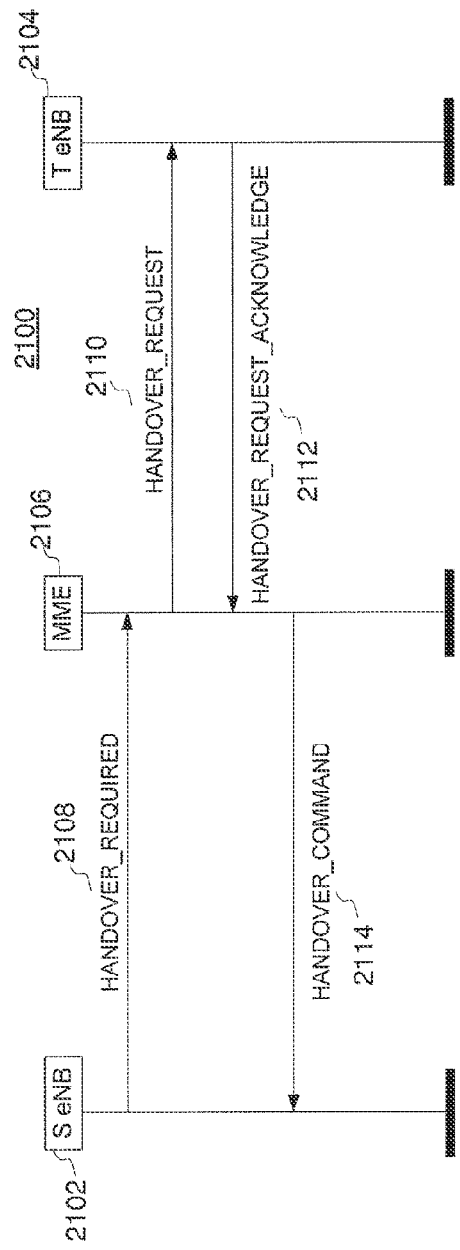
FIG. 21 shows a call flow diagram of an example method for exchanging sensing results over the S1 interface.

FIG. 21 shows a call flow diagram of an example method 2100 for exchanging sensing results over the S1 interface. The serving eNB 2102 may forward the results to the MME 2106 using the "HANDOVER_REQUIRED" S1AP message 2108. Then the MME 2106 may forward the results to the target eNB 2104 using the "HANDOVER_REQUEST" S1AP message 2110. The target eNB may acknowledge the receipt using the "HANDOVER_REQUEST_ACKNOWL-EDGE" S1AP message 2112. The MME 2106 may forward the acknowledgement to the serving eNB 2102 using the "HANDOVER_COMMAND" S1AP message 2114.

According to another example embodiment, the sensing results may be signaled during the random access channel (RACH) procedure with the target eNB. As soon as the handover is signaled to the WTRU by the source eNB, the WTRU may start a RACH procedure with the target eNB. During this time, the WTRU may be allocated uplink resources and also signaled timing alignment and other parameters by the target eNB. The WTRU may send the sensing results to the target eNB with the Random_Access_Preamble_Transmission, which may initiate the RACH procedure with target eNB.

According to another example embodiment, the sensing results may be signaled after the RACH procedure using, for example, the RRCConnectionReconfigurationComplete signal. The WTRU may also use the RRCConnectionRecon-figurationComplete signal immediately after the handover is completed to send the sensing results to the target eNB.

Another embodiment is directed to multiple allocated SuppCells with different gap patterns at an eNB.

When multiple SuppCells are allocated at an eNB, each SuppCell may have a different measurement gap duty cycle.

Moreover, some of the SuppCells may share the same radio front end. Sensing on the SuppCells sharing the same radio front end should be performed in such a way that sensing measurements are enabled only during the overlapping gap durations on these SuppCells. The rest of the gap may be ignored for measurements because the self-interference caused by the signal leakage from the transmission on a channel on the same band may impact the quality of measurements made on the duration of the gap with the leakage issue. An example of this scenario showing different measurement gap duty cycles of two allocated SuppCells over either a single TVWS low band or a single high band is shown in FIG. 22.

Figure 22:
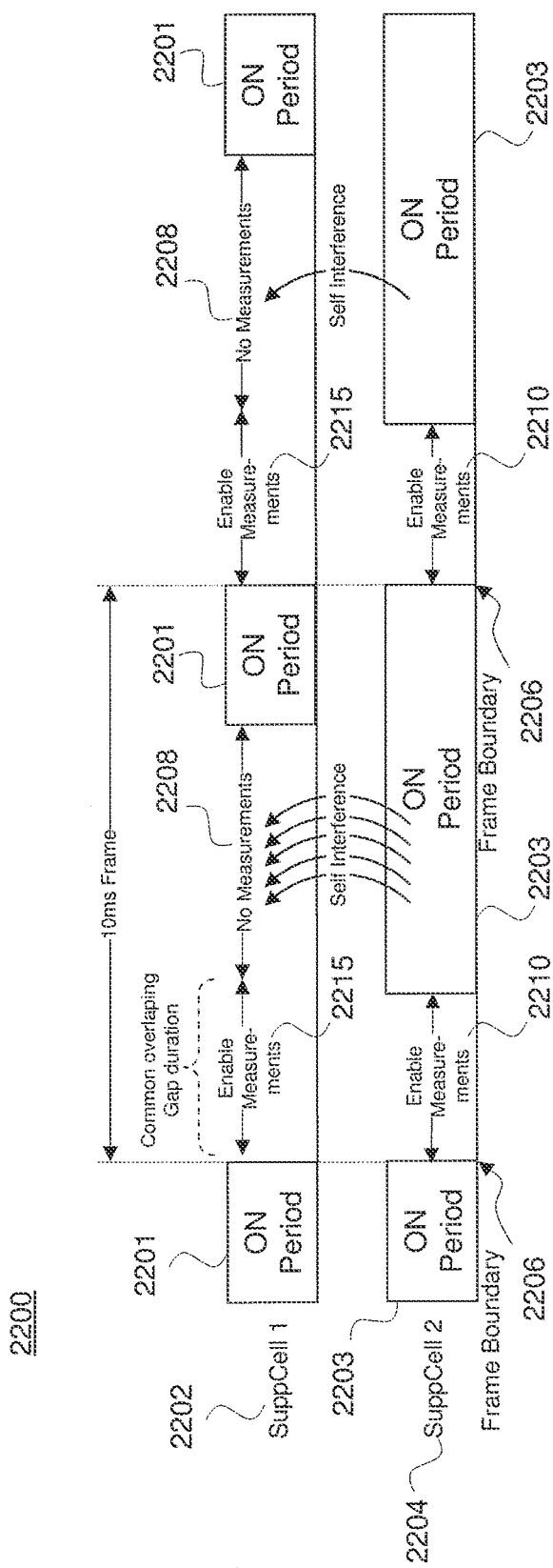
FIG. 22 shows measurement/gap schedules for two SuppCells with different measurement/gap durations over a single television white space (TVWS) low (or high) band.

FIG. 22 shows measurement/gap schedules 2200 for two SuppCells 2202 and 2204 with different measurement/gap durations over a single TVWS low (or high) band. SuppCell 2202 alternates active periods 2201 and gap periods 2208. SuppCell 2204 alternates active periods 2203 and gap periods 2210. In the example of FIG. 22, the two SuppCells 2202 and 2204 allocated to an eNB are chosen to be frame boundary 2206 aligned. This may imply that the measurement gaps 2208 and 2210 in SuppCell 2202 and SuppCell 2204, respectively, may be synchronized to start at the beginning of each frame boundary 2206. In this example, SuppCell 2204 has a shorter gap duration 2210 than the gap duration 2208 of SuppCell 2202. The measurements on both SuppCell 2202 and SuppCell 2204 may be enabled during the common overlapping gap time 2215, which in this example corresponds to SuppCell's 2204 gap 2210.

The reporting times discussed above may be for measurements that are ready and do not have high latency in processing. For measurements which need large processing times, the reporting may be delayed accordingly.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method, performed by a wireless transmit/receive unit (WTRU), for performing sensing during sensing measurement gaps associated with a serving eNB supplementary cell (SuppCell), the method comprising:
   receiving measurement configuration parameters from a serving eNB the measurement configuration parameters being indicative of a plurality of active periods that are separated by the serving eNB SuppCell measurement gaps;
   performing measurements during serving eNB SuppCell measurement gaps based on the measurement configuration parameters to generate measurement reports; and
   sending the measurement reports to the serving eNB.

2. The method of claim 1 wherein the measurement reports include at least one of:
   a first time stamp corresponding to a start event of at least one neighbor eNB SuppCell measurement gap;
   a second time stamp corresponding to an end event of the at least one neighbor eNB SuppCell measurement gap; or
   a duration value corresponding to a time duration between consecutive start and end events of neighbor eNB SuppCell measurement gaps.

3. The method of claim 2 further comprising:
   determining the start event of the at least one neighbor eNB SuppCell measurement gap when the measurements of neighbor eNB SuppCell fall below a threshold.

4. The method of claim 2 further comprising:
   determining the end event of the at least one neighbor eNB SuppCell measurement gap when the measurements of neighbor eNB SuppCell goes above a threshold.

5. A method, performed by a wireless transmit/receive unit (WTRU), for performing enhanced measurement procedures in a radio resource control (RRC), the method comprising:
   receiving an RRC connection reconfiguration message that comprises:
   a sensing measurement object identifier associated with a license-exempt (LE) channel on which a supplementary cell can operate,
   a channel type associated with a respective LE channel, and
   a sensing measurement gap schedule that indicates periods where the WTRU may perform sensing; and
   performing sensing measurements based on the channel type and the sensing measurement gap schedule.

6. The method of claim 5 wherein the RRC connection reconfiguration message further comprises: a list of sensing reporting configurations that comprises at least one of:
   reporting criterion for triggering the WTRU to send a measurement report;
   a reporting format; or
   reporting quantities.

7. The method of claim 6 wherein the reporting format includes at least one of:
   a channel occupancy; a primary user (PU) detection value;
   a PU type;
   a secondary user (SU) detection value; or
   an SU type.

8. The method of claim 6 wherein the reporting quantities include at least one of:
   a probability of misdetection;
   a probability of false alarm;
   a secondary user (SU) utilization index;
   a SU utilization threshold;
   a first time stamp for a neighbor supplementary cell (SuppCell) measurement going above a threshold;
   a second time stamp for the neighbor SuppCell measurement going below a threshold;
   or
   a listen before talk success rate value.

9. The method of claim 5 wherein the periods where the WTRU may perform sensing are associated with periods where no other uplink or downlink transmissions are scheduled.

10. The method of claim 5 wherein the RRC connection reconfiguration further comprises: a white space channel index of a LE spectrum band.

11. A wireless transmit/receive unit (WTRU) configured to perform sensing during sensing measurement gaps associated with a serving eNB supplementary cell (SuppCell), the WTRU comprising:
 a receiver configured to receive measurement configuration parameters from a serving eNB, the measurement configuration parameters being indicative of a plurality of active periods are separated by serving eNB SuppCell measurement gaps;
 a processor configured to perform measurements during the serving eNB SuppCell measurement gaps based on the measurement configuration parameters to generate measurement reports; and
 a transmitter configured to send the measurement reports to the serving eNB.

12. The WTRU of claim 11 wherein the measurement reports include at least one of:
 a first time stamp corresponding to a start event of at least one neighbor eNB SuppCell measurement gap;
 a second time stamp corresponding to an end event of the at least one neighbor eNB SuppCell measurement gap; or
 a duration value corresponding to a time duration between consecutive start and end events of neighbor eNB SuppCell measurement gaps.

13. The WTRU of claim 12 further configured to:
 determine the start event of the at least one neighbor eNB SuppCell measurement gap when the measurements of neighbor eNB SuppCell fall below a threshold.

14. The WTRU of claim 12 further configured to:
 determine the end event of the at least one neighbor eNB SuppCell measurement gap when the measurements of neighbor eNB SuppCell goes above a threshold.

15. A wireless transmit/receive unit (WTRU) configured to perform enhanced measurement procedures in a radio resource control (RRC), the WTRU comprising:
 a receiver configured to receive an RRC connection reconfiguration message that comprises:
  a sensing measurement object identifier associated with a license-exempt (LE) channel on which a supplementary cell can operate;
  a channel type associated with a respective LE channel, and
  a sensing measurement gap schedule that indicates periods where the WTRU may perform sensing; and
 a processor configured to perform sensing measurements based on the channel type and the sensing measurement gap schedule.

16. The WTRU of claim 15 wherein the RRC connection reconfiguration message further comprises: a list of sensing reporting configurations that comprises at least one of:
 reporting criterion for triggering the WTRU to send a measurement report;
 a reporting format; or
 reporting quantities.

17. The WTRU of claim 16 wherein the reporting format includes at least one of:
 a channel occupancy;
 a primary user (PU) detection value;
 a PU type;
 a secondary user (SU) detection value; or
 an SU type.

18. The WTRU of claim 17 wherein the reporting quantities include at least one of:
 a probability of misdetection;
 a probability of false alarm;
 a secondary user (SU) utilization index;
 a SU utilization threshold;
 a first time stamp for a neighbor supplementary cell (SuppCell) measurement going above a threshold;
 a second time stamp for the neighbor SuppCell measurement going below a threshold; or
 a listen before talk success rate value.

19. The WTRU of claim 15 wherein the periods where the WTRU may perform sensing are associated with periods where no other uplink or downlink transmissions are scheduled.

20. The WTRU of claim 15 wherein the RRC connection reconfiguration further comprises: a white space channel index of a LE spectrum band.

* * * * *